US011463968B2

(12) United States Patent
Islam et al.

(10) Patent No.: US 11,463,968 B2
(45) Date of Patent: Oct. 4, 2022

(54) TECHNIQUES FOR SIGNALING SYNCHRONIZATION SIGNAL BURST SET PATTERNS

(71) Applicant: QUALCOMM Incorporated, San Diego, CA (US)

(72) Inventors: Muhammad Nazmul Islam, San Diego, CA (US); Bilal Sadiq, Basking Ridge, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 16/130,861

(22) Filed: Sep. 13, 2018

(65) Prior Publication Data
US 2019/0090210 A1   Mar. 21, 2019

Related U.S. Application Data

(60) Provisional application No. 62/559,623, filed on Sep. 17, 2017.

(51) Int. Cl.
*H04W 56/00* (2009.01)
*H04L 5/00* (2006.01)
(Continued)

(52) U.S. Cl.
CPC ........... *H04W 56/001* (2013.01); *H04L 5/005* (2013.01); *H04L 5/0007* (2013.01);
(Continued)

(58) Field of Classification Search
CPC ........... H04W 56/001; H04W 74/0833; H04W 72/005; H04L 5/005; H04L 5/0007; H04L 5/0053; H04L 5/0091
See application file for complete search history.

(56) References Cited

U.S. PATENT DOCUMENTS 10,616,843 B2 * 4/2020 Huang ................ H04W 56/001
10,716,079 B2 * 7/2020 Jung ....................... H04L 5/005
(Continued)

OTHER PUBLICATIONS

CMCC: "Discussion on RACH Configuration," 3GPP Draft; R1-1716046, 3rd Generation Partnership Project (3GPP), Mobile Competence Centre; 650, Route Des Lucioles; F-06921 Sophia-Antipolis Cedex; France, vol. RAN WG1, no. Nagoya, Japan; Sep. 18, 2017-Sep. 21, 2017, Sep. 12, 2017, XP051329709, 7 pages, Retrieved from the Internet: URL: http://www.3gpp.org/ftp/tsg_ran/WG1/_RL1/TSGR1_AH/NR_AH_1709/Docs/ [retrieved on Sep. 12, 2017].

(Continued)

*Primary Examiner* — Min Jung
(74) *Attorney, Agent, or Firm* — Holland & Hart LLP

(57) ABSTRACT

Methods, systems, and devices for wireless communication are described that provide for synchronization signal (SS) burst set patterns in which SSs and broadcast channel transmissions may be transmitted (e.g., in time). A base station may identify a SS burst set pattern indicating positions (e.g., time locations) for SS block transmissions, for example, in bandwidth restricted communication systems. The SS burst set pattern may be determined based on numerology or subcarrier spacing associated with SSs and non-SSs. The base station may transmit an indication of the SS burst set pattern to a wireless device. The wireless device may receive the indication of the SS burst set pattern and determine one or more time locations of SSs (e.g., primary synchronization signal (PSS), secondary synchronization signal (SSS), physical broadcast channel (PBCH) of a SS block). The wireless device may then monitor the identified positions for SSs.

72 Claims, 25 Drawing Sheets

(51) Int. Cl.
    H04W 72/00    (2009.01)
    H04W 74/08    (2009.01)
(52) U.S. Cl.
    CPC .......... *H04L 5/0048* (2013.01); *H04L 5/0053*
           (2013.01); *H04L 5/0091* (2013.01); *H04W
           72/005* (2013.01); *H04W 74/0833* (2013.01);
                            *H04L 5/0051* (2013.01)

(56) References Cited

U.S. PATENT DOCUMENTS

| | | | |
|---|---|---|---|
| 2014/0010131 A1* | 1/2014 | Gaal | H04L 5/0055 370/311 |
| 2017/0187488 A1 | 6/2017 | Rico Alvarino et al. | |
| 2018/0248642 A1* | 8/2018 | Si | H04L 5/0092 |
| 2018/0279380 A1* | 9/2018 | Jung | H04W 56/0005 |
| 2018/0302867 A1* | 10/2018 | Abedini | H04W 56/0015 |
| 2018/0324023 A1* | 11/2018 | Zeng | H04L 27/2656 |
| 2018/0359717 A1* | 12/2018 | Akkarakaran | H04W 8/005 |
| 2018/0376454 A1* | 12/2018 | Åström | H04W 72/0446 |
| 2018/0376501 A1* | 12/2018 | John Wilson | H04W 72/0446 |
| 2019/0037481 A1* | 1/2019 | Zhang | H04W 56/0015 |
| 2019/0053235 A1* | 2/2019 | Novlan | H04L 5/001 |
| 2019/0068348 A1* | 2/2019 | Nam | H04L 5/0053 |
| 2019/0074941 A1* | 3/2019 | Hwang | H04B 1/7156 |
| 2019/0229961 A1* | 7/2019 | Gao | H04J 11/0073 |
| 2020/0127755 A1* | 4/2020 | Ko | H04W 72/0453 |
| 2020/0146107 A1* | 5/2020 | Xiong | H04L 5/0051 |
| 2020/0213973 A1* | 7/2020 | Lee | H04W 72/0466 |
| 2020/0367183 A1* | 11/2020 | Kim | H04W 72/005 |
| 2021/0051747 A1* | 2/2021 | Wu | H04W 56/001 |

OTHER PUBLICATIONS

International Search Report and Written Opinion—PCT/US2018/051155—ISA/EPO—dated Dec. 19, 2018.
Nokia, et al.: "On SS Burst Set Composition," 3GPP Draft; R1-1711261, 3rd Generation Partnership Project (3GPP), Mobile Competence Centre; 650, Route Des Lucioles; F-06921 Sophia-Antipolis Cedex; France, vol. RAN WG1, no. Qingdao, P.R. China; May 15, 2017-May 19, 2017, Jun. 26, 2017, XP051300456, 11 pages, Retrieved from the Internet: URL: http://www.3gpp.org/ftp/Meetings_3GPP_SYNC/RAN1/Docs/ [retrieved on Jun. 26, 2017].
NTT Docomo, et al.: "Discussion on Remaining Details on SS Block and SS Burst Set Design," 3GPP Draft; R1-1713895_Discussion on Remaining Details on SS Block and SS Burst Set Design_Final, 3rd Generation Partnership Project (3GPP), Mobile Competence Centre; 650, Route Des Lucioles; F-0692, vol. RAN WG1, no. Prague, Czech Republic; Aug. 21, 2017-Aug. 25, 2017, Aug. 20, 2017, XP051316687, 5 pages, Retrieved from the Internet: URL: http://www.3gpp.org/ftp/Meetings_3GPP_SYNC/RAN1/Docs/ [retrieved on Aug. 20, 2017].
LG Electronics: "Remaining Issues on Multiple SS Block Transmissions in Wideband CC" [online], 3GPP TSG RAN WG1 Meeting NR#2, 3GPP TSG RAN WG1 #AH, 3GPP Draft, R1-1710261, Qingdao, P.R. China, Jun. 27-30, 2017, 4 Pages, Jun. 17, 2017, Retrieved from the Internet: URL:http://www.3gpp.org/ftp/tsg_ran/WG1_RL1/TSGR1_AH/NR_AH 1706/Docs/R1-1710261.zip.
Nokia: "Way Forward on the Mapping of SS Blocks", R1-1711899, 3GPP TSG RAN WG1 Meeting NR-adhoc#2, Qingdao, China, Jun. 27-30, 2017, 10 Pages.
CATT: "Multiple SS block Transmission in Wideband", 3GPP Draft, 3GPP TSG RAN WG1#90, R1-1712350, SS Burst Set Composition And Ss Block Configuration, 3rd Generation Partnership Project (3GPP), Mobile Competence Centre, 650, Route Des Lucioles, F-06921 Sophia-Antipolis Cedex, France, vol. Ran WG1, No. Prague, Czechia, Aug. 21, 2017-Aug. 25, 2017 Aug. 20, 2017, XP051315166, Retrieved from the Internet: URL: http://www.3gpp.org/ftp/Meetings_3GPP_SYNC/RAN1/Docs/ [retrieved on Aug. 20, 2017], 8 Pages.
Taiwan Search Report—TW107132607—TIPO—dated Apr. 6, 2022.
Huawei, et al., "Discussion on SS Burst Set Composition and SS Block Time Index Indication", 3GPP Draft; R1-1705052, 3GPP TSG RAN WG1 Meeting #8 8bis, 3rd Generation Partnership Project (3GPP), Mobile Competence Centre; 650, Route Des Lucioles; F-06921 Sophia-Antipolis Cedex; France, vol. Ran WG1, No. Spokane, USA; Apr. 3, 2017-Apr. 7, 2017 Apr. 2, 2017, XP051243183, Retrieved from the Internet: URL:http://www.3gpp.org/ftp/Meetings_3GPP_SYNC/RAN1/Docs/ [retrieved on Apr. 2, 2017], 9 pages, Mar. 25, 2017.
Nokia, et al., "On SS Burst and Burst Set Composition", 3GPP TSG RAN WG1 #89, RI-1708232, 3GPP, Hangzhou, P.R. China May 15-19, 2017, May 5, 2017, 11 Pages.

* cited by examiner

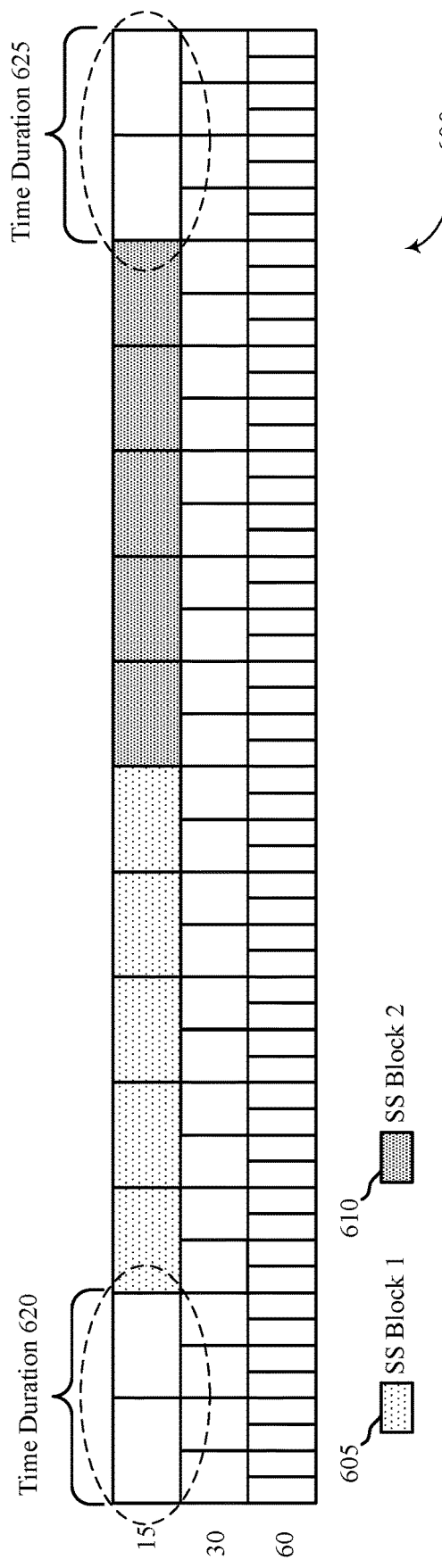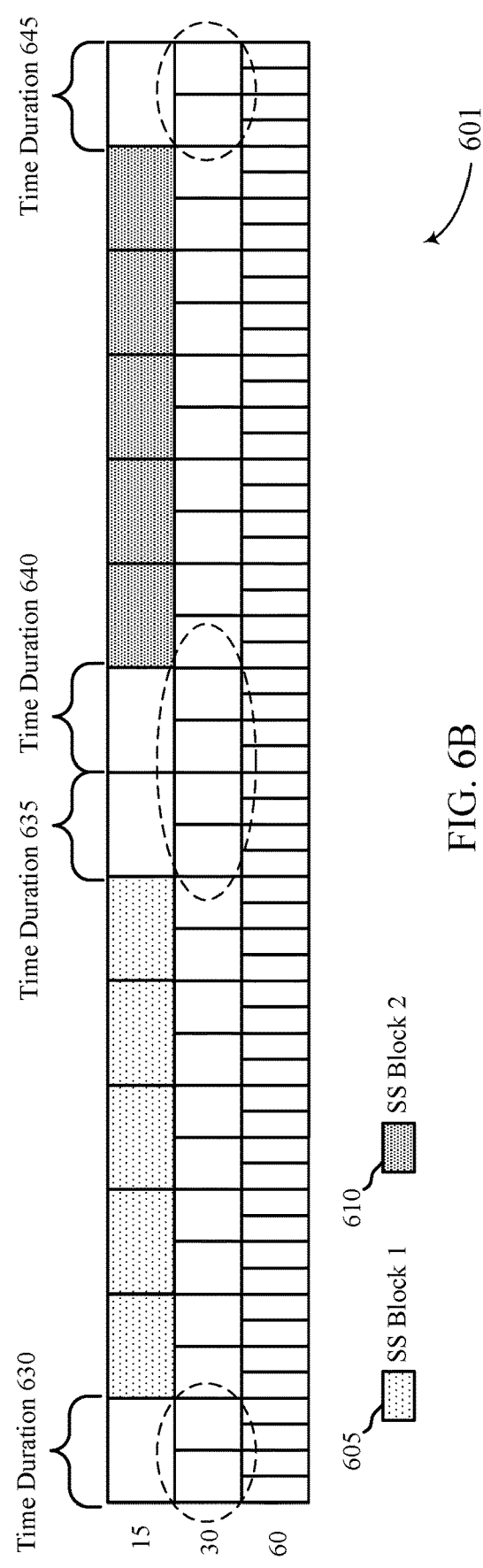
FIG. 6A
FIG. 6B

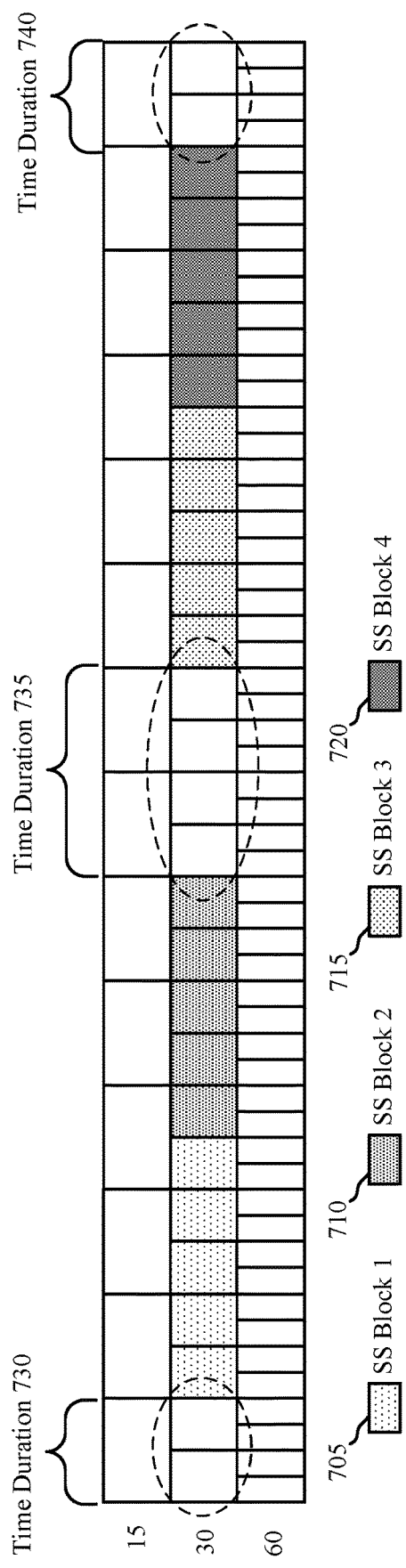
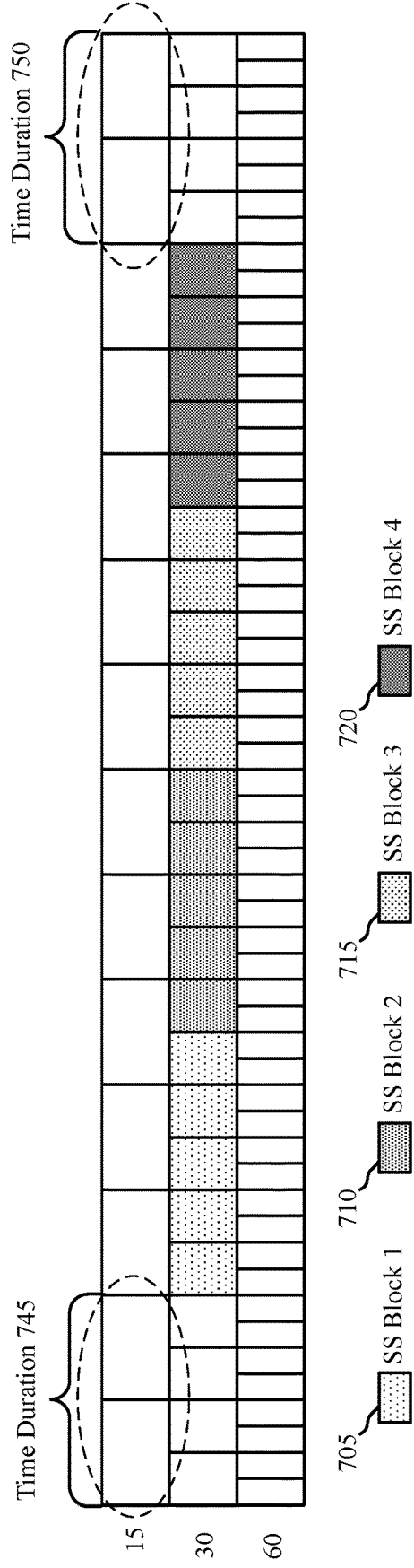
FIG. 7A
FIG. 7B

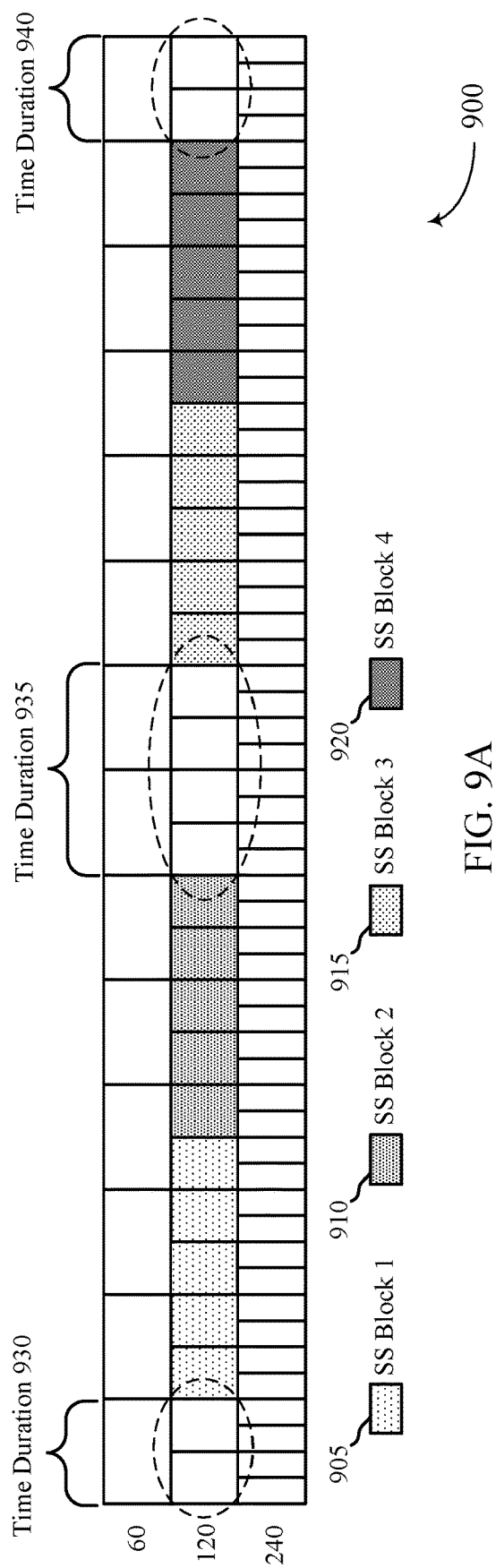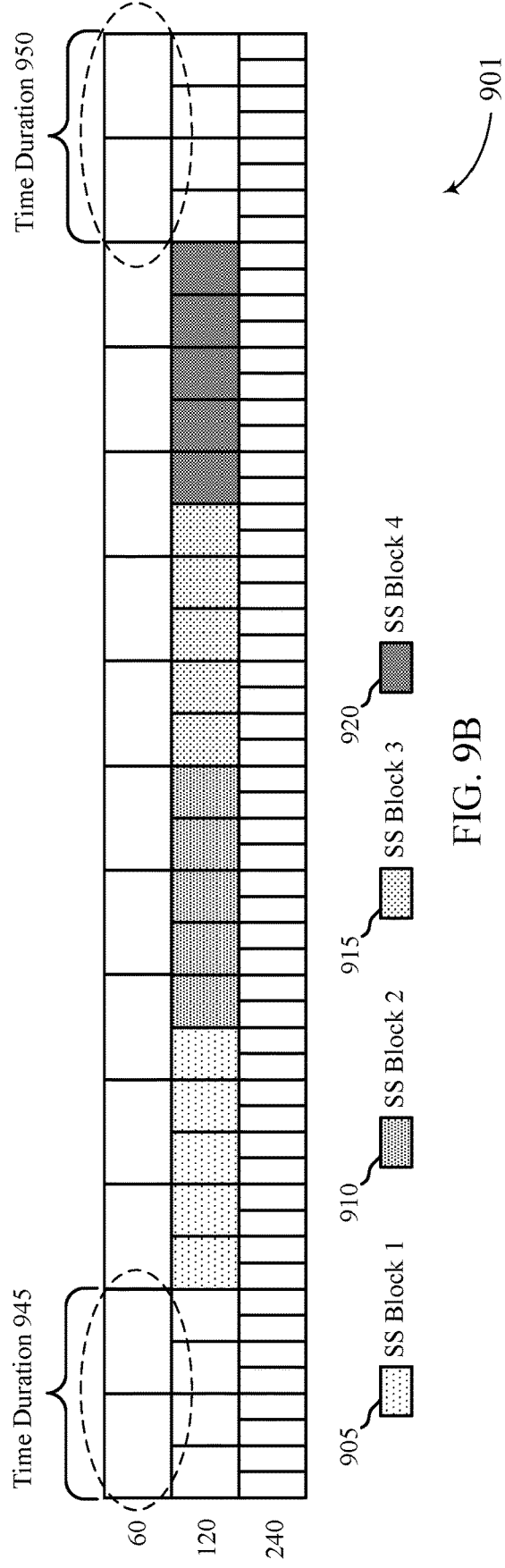
FIG. 9A
FIG. 9B

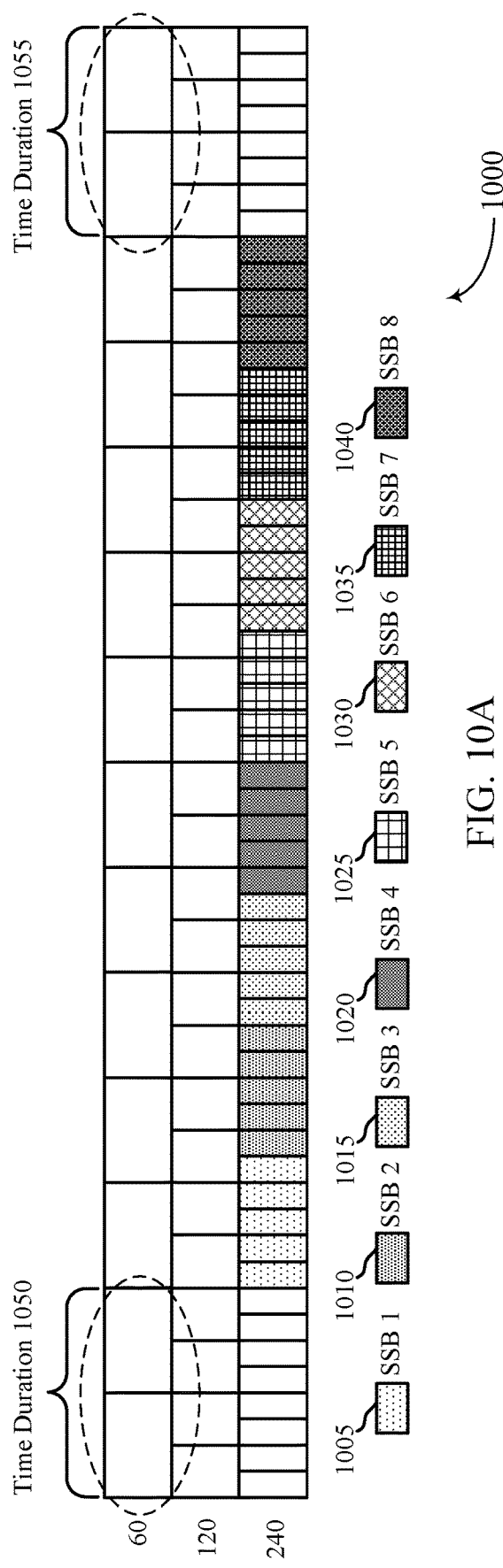
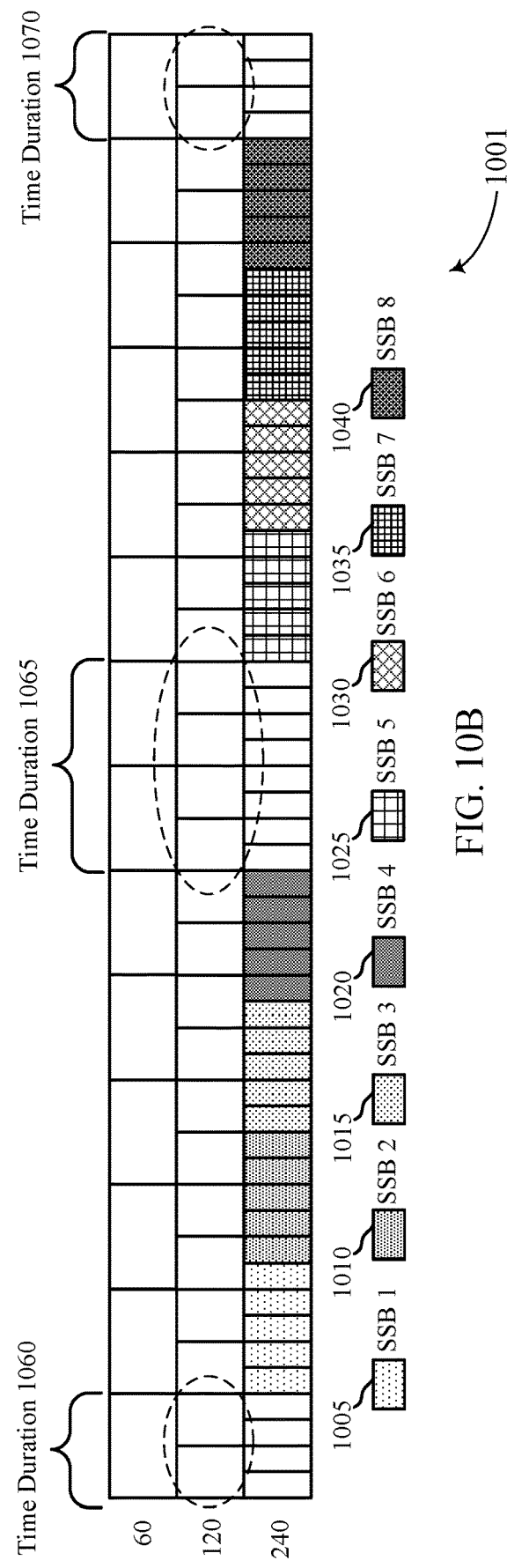
FIG. 10A
FIG. 10B

TECHNIQUES FOR SIGNALING SYNCHRONIZATION SIGNAL BURST SET PATTERNS

CROSS REFERENCES

The present application for patent claims the benefit of U.S. Provisional Patent Application No. 62/559,623 by ISLAM, et al., entitled "TECHNIQUES FOR SIGNALING SYNCHRONIZATION SIGNAL BURST SET PATTERNS," filed Sep. 17, 2017, assigned to the assignee hereof, and expressly incorporated herein by reference in its entirety.

BACKGROUND

The following relates generally to wireless communication, and more specifically to techniques for signaling synchronization signal (SS) burst set patterns.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

At times, a UE may need to perform an initial access (or initial acquisition) procedure to gain access to a wireless network. As part of the initial access procedure, the UE may need to search for a synchronization channel transmitted by a network access device, such as a base station, of the wireless network. The UE also may acquire various items of system information, such as contained in a master information block (MIB) or one or more system information blocks (e.g., SIB1, SIB2, etc.) that may be transmitted in a physical broadcast channel (PBCH) transmission from a base station. A base station may transmit SSs (e.g., a primary synchronization signal (PSS), secondary synchronization signal (SSS), etc.) to assist a UE in connecting to and communicating with a network. These SSs may be included in certain time and frequency resources (e.g., SS blocks) that are transmitted at different times and may also be multiplexed on frequency resources of different radio frequency (RF) bands. Improved techniques for scheduling and conveying SS blocks (e.g., SS burst set patterns) may be desired.

SUMMARY

The described techniques relate to improved methods, systems, devices, or apparatuses that support techniques for signaling synchronization signal (SS) burst set pattern. Generally, the described techniques provide for SS blocks in which SSs and physical broadcast channel (PBCH) transmissions may be transmitted in different system operating conditions, such as different data tone or subcarrier spacing used by different numerologies). In some cases, PBCH transmissions may be demodulated using SS transmissions, reference signal transmissions, or combinations thereof. PBCH transmissions may be transmitted in a subset of SS block time resources, for example in one, two, or three symbols of an SS block. SSs, such as a primary synchronization signal (PSS) and secondary synchronization signal (SSS), may be transmitted in another subset of SS block time resources, for example in two or more symbols.

An SS burst set pattern (or SS block set pattern) may indicate a time location of SS blocks. For example, an SS burst set pattern may indicate a symbol, slot, radio frame location, etc. of SS blocks (e.g., the SS burst set pattern may indicate slots that include SS blocks, as well as which symbols within each slot include SS block information). According to techniques described herein, the SS burst set pattern may be identified or determined based on transmission numerology used within the wireless communications system. That is, an SS burst set pattern may depend on a numerology or subcarrier spacing used for synchronization (SYNC) signals and/or a numerology or subcarrier spacing used for non-SSs (e.g., such as data, uplink control, downlink control, etc.). For example, the SYNC numerology and non-SYNC numerology may be taken into account such that SS burst set patterns allow for reservation of one or two symbols of the slot prior to the positions of SS blocks for downlink control, reservation of one or two symbols of a slot after the positions of SS blocks for uplink control, reservation of a guard period between two or more sets of SS blocks of the SS burst set pattern, etc. The SS burst set pattern may thus incorporate non-SYNC numerology for reservation of symbols for non-SSs as well as SYNC numerology for positioning of the SS blocks.

In some cases, a base station may identify a SS burst set pattern (e.g., based on an identified subcarrier spacing of SSs and/or an identified subcarrier spacing of non-SSs). The base station may then transmit an indication of the SS burst set pattern to a user equipment (UE). For example, the base station may transmit the SS burst set pattern indication via a PSS, SSS, demodulation reference signal (DMRS) of a PBCH, a PBCH payload, master information block (MIB), system information block (SIB), radio resource control (RRC) transmission, a handover message, etc. In other cases, the base station may indicate numerology used for SSs and non-SSs, and the UE may implicitly derive the SS burst set pattern (e.g., SS burst set patterns may be predefined or configured by the network for different transmission numerologies). A method of wireless communication is described.

The method may include receiving an indication of a SS burst set pattern and determining a time location of one of more SSs based at least in part on the received indication.

An apparatus for wireless communication is described. The apparatus may include means for receiving an indication of a SS burst set pattern and means for determining a time location of one of more SSs based at least in part on the received indication.

Another apparatus for wireless communication is described. The apparatus may include a processor, memory in electronic communication with the processor, and instructions stored in the memory. The instructions may be operable to cause the processor to receive an indication of a SS burst set pattern and determine a time location of one of more SSs based at least in part on the received indication.

A non-transitory computer readable medium for wireless communication is described. The non-transitory computer-readable medium may include instructions operable to cause a processor to receive an indication of a SS burst set pattern and determine a time location of one of more SSs based at least in part on the received indication.

Some examples of the method, apparatus, and non-transitory computer-readable medium described above may further include processes, features, means, or instructions for identifying positions to monitor for one or more sets of SS blocks based at least in part on the received indication of the SS burst set pattern. Some examples of the method, apparatus, and non-transitory computer-readable medium described above may further include processes, features, means, or instructions for monitoring the identified positions for the one or more sets of SS blocks.

In some examples of the method, apparatus, and non-transitory computer-readable medium described above, receiving the indication of the SS burst set pattern comprises: receiving an indication of a slot occupancy pattern for a set of slots, the slot occupancy pattern indicating one or more slots of the set of slots that contain SS blocks of the one or more sets of SS blocks.

In some examples of the method, apparatus, and non-transitory computer-readable medium described above, a set of SS blocks of the one or more sets of SS blocks comprises a PSS symbol, an SSS symbol, one or more PBCH symbols, and one or more DMRSs of one or more PBCH symbols.

In some examples of the method, apparatus, and non-transitory computer-readable medium described above, an ordering of the set of SS symbols comprises the PSS symbol, followed by a first of the one or more PBCH symbols, followed by the SSS symbol, followed by a second of the one or more PBCH symbols, followed by a third of the one or more PBCH symbols.

Some examples of the method, apparatus, and non-transitory computer-readable medium described above may further include processes, features, means, or instructions for identifying positions to monitor for control information based at least in part on the received indication of the SS burst set pattern.

In some examples of the method, apparatus, and non-transitory computer-readable medium described above, the one or more sets of SS blocks may be monitored for in a first subcarrier spacing. In some examples of the method, apparatus, and non-transitory computer-readable medium described above, the control information may be monitored for in a second subcarrier spacing.

Some examples of the method, apparatus, and non-transitory computer-readable medium described above may further include processes, features, means, or instructions for monitoring for control information in a slot prior to the positions monitored for the one or more sets of SS blocks, wherein the control information comprises downlink control information.

In some examples of the method, apparatus, and non-transitory computer-readable medium described above, monitoring for the control information in the slot comprises: monitoring for the downlink control information in one or two symbols of the slot prior to the positions monitored for the one or more sets of SS blocks.

Some examples of the method, apparatus, and non-transitory computer-readable medium described above may further include processes, features, means, or instructions for transmitting uplink control information in one or two symbols of a slot after the positions in the slot monitored for the one or more sets of SS blocks.

Some examples of the method, apparatus, and non-transitory computer-readable medium described above may further include processes, features, means, or instructions for identifying, based at least in part on the received indication of the SS burst set pattern, a guard period between two of the one or more sets of SS blocks.

In some examples of the method, apparatus, and non-transitory computer-readable medium described above, receiving the indication of the SS burst set pattern comprises: receiving a PSS, or an SSS, or a DMRS of a PBCH, or a PBCH payload, or an MIB, or an SIB, or an RRC transmission, or a handover message, or a combination thereof, that indicates the SS burst set pattern.

In some examples of the method, apparatus, and non-transitory computer-readable medium described above, receiving the indication of the SS burst set pattern comprises: receiving an indication of a time location of SS blocks within the SS burst set pattern.

In some examples of the method, apparatus, and non-transitory computer-readable medium described above, the indication of the time location of the SS blocks comprises a symbol, or a slot, or a radio frame location, or a combination thereof, of the SS blocks within the SS burst set pattern.

Some examples of the method, apparatus, and non-transitory computer-readable medium described above may further include processes, features, means, or instructions for identifying a first subcarrier spacing for SSs. Some examples of the method, apparatus, and non-transitory computer-readable medium described above may further include processes, features, means, or instructions for identifying the SS burst set pattern based at least in part on the received indication of the SS burst set pattern and the first subcarrier spacing.

Some examples of the method, apparatus, and non-transitory computer-readable medium described above may further include processes, features, means, or instructions for identifying a second subcarrier spacing for non-SSs. Some examples of the method, apparatus, and non-transitory computer-readable medium described above may further include processes, features, means, or instructions for identifying the SS burst set pattern based at least in part on the received indication of the SS burst set pattern and the second subcarrier spacing.

In some examples of the method, apparatus, and non-transitory computer-readable medium described above, receiving the indication of the SS burst set pattern comprises: receiving a first indication of a first subcarrier spacing for SSs. Some examples of the method, apparatus, and non-transitory computer-readable medium described above may further include processes, features, means, or instructions for receiving a second indication of a second subcarrier spacing for non-SSs. Some examples of the method, apparatus, and non-transitory computer-readable medium described above may further include processes, features, means, or instructions for identifying the SS burst set pattern based at least in part on received first indication and the received second indication.

Some examples of the method, apparatus, and non-transitory computer-readable medium described above may further include processes, features, means, or instructions for identifying an SS burst set pattern based at least in part on the received indication. Some examples of the method, apparatus, and non-transitory computer-readable medium described above may further include processes, features, means, or instructions for determining a time location of one or more combinations of a grant, or a payload of system information, or a combination thereof based at least in part on the identified SS burst set pattern.

Some examples of the method, apparatus, and non-transitory computer-readable medium described above may further include processes, features, means, or instructions for identifying an SS burst set pattern based at least in part on the received indication. Some examples of the method, apparatus, and non-transitory computer-readable medium described above may further include processes, features, means, or instructions for determining a time location of one or more random access channel (RACH) resources based at least in part on the identified SS burst set pattern.

Some examples of the method, apparatus, and non-transitory computer-readable medium described above may further include processes, features, means, or instructions for identifying an SS burst set pattern based at least in part on the received indication. Some examples of the method, apparatus, and non-transitory computer-readable medium described above may further include processes, features, means, or instructions for determining a time location of a channel state information reference signal (CSI-RS), or a measurement reference signal (MRS), or a combination thereof, based at least in part on the identified SS burst set pattern.

A method of wireless communication is described. The method may include identifying a SS burst set pattern, the SS burst set pattern indicating positions for one or more sets of SS blocks, transmitting an indication of the identified SS burst set pattern, and transmitting the one or more sets of SS blocks based at least in part on the identified SS burst set pattern.

An apparatus for wireless communication is described. The apparatus may include means for identifying a SS burst set pattern, the SS burst set pattern indicating positions for one or more sets of SS blocks, means for transmitting an indication of the identified SS burst set pattern, and means for transmitting the one or more sets of SS blocks based at least in part on the identified SS burst set pattern.

Another apparatus for wireless communication is described. The apparatus may include a processor, memory in electronic communication with the processor, and instructions stored in the memory. The instructions may be operable to cause the processor to identify a SS burst set pattern, the SS burst set pattern indicating positions for one or more sets of SS blocks, transmit an indication of the identified SS burst set pattern, and transmit the one or more sets of SS blocks based at least in part on the identified SS burst set pattern.

A non-transitory computer readable medium for wireless communication is described. The non-transitory computer-readable medium may include instructions operable to cause a processor to identify a SS burst set pattern, the SS burst set pattern indicating positions for one or more sets of SS blocks, transmit an indication of the identified SS burst set pattern, and transmit the one or more sets of SS blocks based at least in part on the identified SS burst set pattern.

In some examples of the method, apparatus, and non-transitory computer-readable medium described above, transmitting the indication of the identified SS burst set pattern comprises: transmitting a PSS, or an SSS, or a DMRS of a PBCH, or a PBCH payload, or an MIB, or an SIB, or an RRC transmission, or a handover message, or a combination thereof, that indicates the identified SS burst set pattern.

In some examples of the method, apparatus, and non-transitory computer-readable medium described above, identifying the SS burst set pattern further comprises: identifying a time location of the one or more sets of SS blocks within the SS burst set pattern.

In some examples of the method, apparatus, and non-transitory computer-readable medium described above, the time location of the one or more sets of SS blocks within the SS burst set pattern comprises a symbol, or a slot, or a radio frame location, or a combination thereof, of the SS blocks within the SS burst set pattern.

In some examples of the method, apparatus, and non-transitory computer-readable medium described above, transmitting the indication of the identified SS burst set pattern comprises: transmitting an indication of a slot occupancy pattern for a set of slots, the slot occupancy pattern indicating one or more slots of the set of slots that contain SS blocks of the one or more sets of SS blocks.

Some examples of the method, apparatus, and non-transitory computer-readable medium described above may further include processes, features, means, or instructions for identifying a first subcarrier spacing for SSs. Some examples of the method, apparatus, and non-transitory computer-readable medium described above may further include processes, features, means, or instructions for identifying the SS burst set pattern based at least in part on the first subcarrier spacing.

In some examples of the method, apparatus, and non-transitory computer-readable medium described above, identifying the first subcarrier spacing comprises: identifying the first subcarrier spacing based at least in part on a system operating bandwidth.

Some examples of the method, apparatus, and non-transitory computer-readable medium described above may further include processes, features, means, or instructions for identifying a second subcarrier spacing for non-SSs. Some examples of the method, apparatus, and non-transitory computer-readable medium described above may further include processes, features, means, or instructions for identifying the SS burst set pattern based at least in part on the second subcarrier spacing.

In some examples of the method, apparatus, and non-transitory computer-readable medium described above, identifying the second subcarrier spacing comprises: identifying the second subcarrier spacing based at least in part on a system operating bandwidth.

In some examples of the method, apparatus, and non-transitory computer-readable medium described above, transmitting the indication of the identified SS burst set pattern comprises: transmitting a first indication of a first subcarrier spacing for SSs. Some examples of the method, apparatus, and non-transitory computer-readable medium described above may further include processes, features, means, or instructions for transmitting a second indication of a second subcarrier spacing for non-SSs.

In some examples of the method, apparatus, and non-transitory computer-readable medium described above, a set of SS blocks of the one or more sets of SS blocks comprises a PSS symbol, an SSS symbol, one or more PBCH symbols, and one or more DMRS of one or more PBCH symbols.

In some examples of the method, apparatus, and non-transitory computer-readable medium described above, an ordering of the set of SS symbols comprises the PSS symbol, followed by a first of the one or more PBCH symbols, followed by the SSS symbol, followed by a second of the one or more PBCH symbols, followed by a third of the one or more PBCH symbols.

Some examples of the method, apparatus, and non-transitory computer-readable medium described above may further include processes, features, means, or instructions for transmitting, based at least in part on the identified SS burst set pattern, control information in a slot using a first subcarrier spacing, wherein the one or more sets of SS blocks may be transmitted in the slot using a second subcarrier spacing.

In some examples of the method, apparatus, and non-transitory computer-readable medium described above, the control information comprises downlink control information.

Some examples of the method, apparatus, and non-transitory computer-readable medium described above may further include processes, features, means, or instructions for transmitting downlink control information in a slot prior to transmitting the one or more sets of SS blocks in the slot based at least in part on the identified SS burst set pattern.

In some examples of the method, apparatus, and non-transitory computer-readable medium described above, transmitting the downlink control information in the slot comprises: transmitting the downlink control information in one or two symbols of the slot prior to transmitting the one or more sets of SS blocks in the slot.

Some examples of the method, apparatus, and non-transitory computer-readable medium described above may further include processes, features, means, or instructions for monitoring for uplink control information in one or two symbols of a slot after transmitting the one or more sets of SS blocks in the slot.

BRIEF DESCRIPTION OF THE DRAWINGS

FIGS. 6A through 10B illustrate examples of an SS burst set pattern that supports techniques for signaling SS burst set patterns in accordance with aspects of the present disclosure.

DETAILED DESCRIPTION

Figure 1:
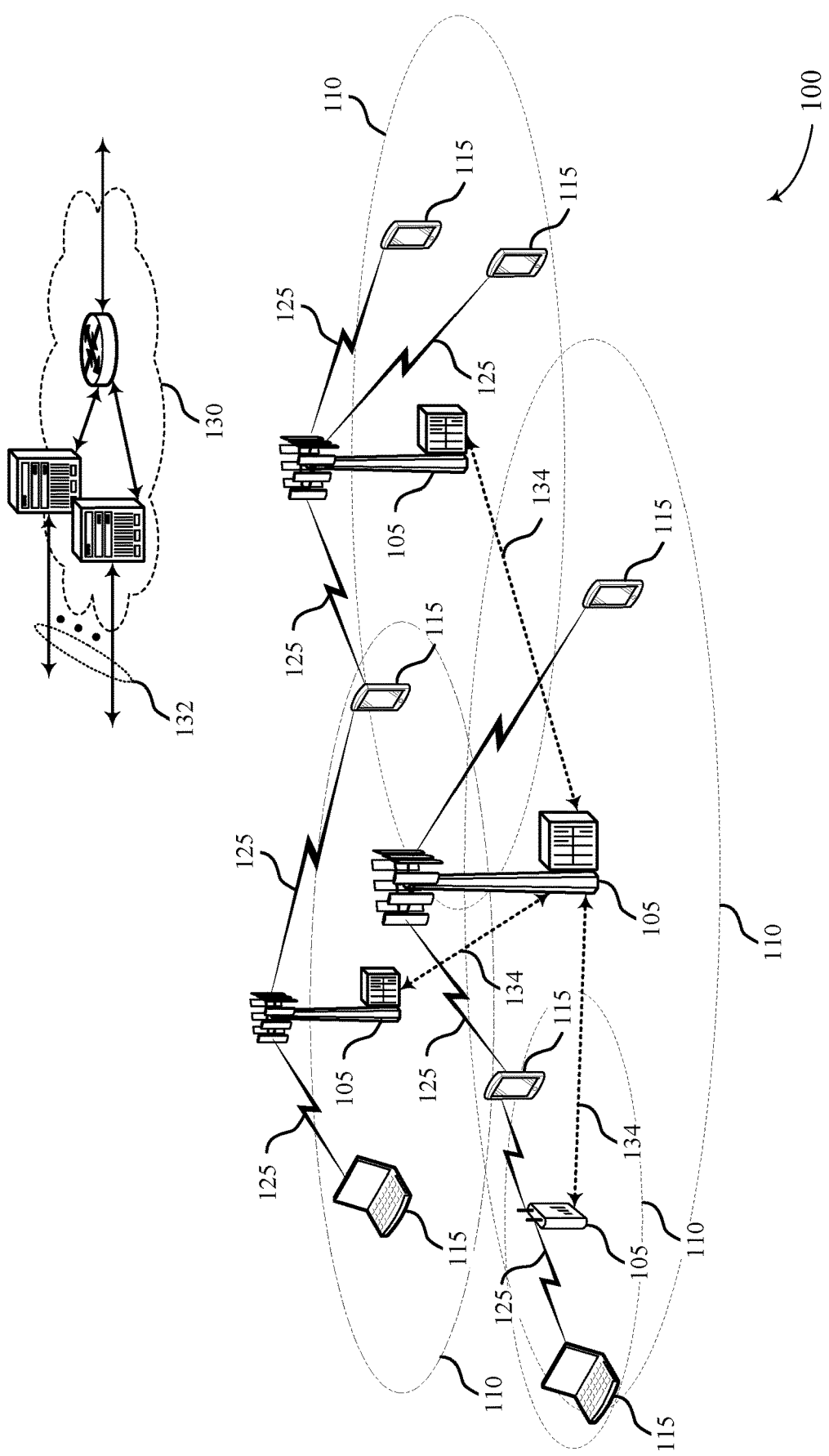
FIG. 1 illustrates an example of a system for wireless communication that supports techniques for signaling synchronization signal (SS) burst set patterns in accordance with aspects of the present disclosure.

Wireless communications systems as described herein may be configured to provide synchronization signal (SS) blocks in which SSs and physical broadcast channel (PBCH) transmissions may be transmitted, to aid a user equipment (UEs) in initial acquisition and communication with a base station. In some examples, PBCH transmissions may be transmitted in a subset of SS block time resources (e.g., in one, two, or three symbols of an SS block), and SSs (e.g., primary synchronization signal (PSS) and secondary synchronization signal (SSS)) may be transmitted in another subset of SS block time resources (e.g., in two symbols of an SS block). Therefore, an SS block may denote a combination of PSS, SSS, PBCH, and DMRS of PBCH signals, or a subset of these. SS blocks may be transmitted in a group of one or more SS blocks, which may be referred to as a SS burst set. A UE may use a SS burst set pattern, for example, to determine or find time locations for system information block (SIB) resources, random access channel (RACH) resources, channel state information reference signal (CSI-RS) resources, etc. In some cases, locations or patterns of SS blocks within an SS burst set may be identified for each radio frequency (RF) band, depending on SS block transmission numerology and data/control transmission numerology, or other configuration for slots or radio frame design, etc.

In some examples (e.g., wireless communications systems using two PBCH symbols per SS block), PBCH transmissions may be transmitted using a larger frequency bandwidth than SS transmissions, in which one or more reference signal transmissions (e.g., demodulation reference signal (DMRS) transmissions) in the PBCH transmissions may be useful to provide reliable demodulation of the PBCH transmissions. However, some wireless communications systems may operate in a reduced bandwidth for some carrier frequencies, or otherwise be constrained by a wireless communication system to operate in a reduced bandwidth. In such cases, the PBCH transmissions may not be transmitted using a larger frequency bandwidth than SS transmissions (e.g., PBCH transmissions may be transmitted using a frequency bandwidth consistent with the frequency bandwidth used for SS transmissions). Therefore, in order to support the PBCH payload (e.g., in order to convey the necessary PBCH information), wireless communications systems may employ an increased number of PBCH symbols per SS block, for example three or more PBCH symbols. In such cases (e.g., wireless communications systems operating under bandwidth restrictions or PBCH bandwidth constraints), SS blocks may use additional symbols and may thus be associated with different SS burst set patterns (e.g., SS block set patterns) in order to account for sufficient control signaling (e.g., slot occupancy patterns for SS blocks may be designed to account for different system requirements such as control regions for downlink control signaling, uplink control signaling, etc.). SS burst set patterns described herein may further consider scenarios where SSs and data or control signals may be communicated using different subcarrier spacing or tone numerology.

Multiple SS burst set patterns may be defined for each carrier band. Different SS burst set patterns may denote different slot occupancy patterns of slots containing SS blocks within a given set of slots, or different patterns of symbols containing SS block information within a slot. Different SS burst set patterns may support different system operating constraints. Wireless communications systems may support coexistence between different SYNC spacing (e.g., for PSS, SSS, PBCH, DMRS for PBCH, etc., of an SS block) and non-SYNC tone spacing (e.g. data, control, etc., not part of the SS blocks). For example, wireless communications systems using sub-6 GHz-operating bandwidths may support SYNC subcarrier spacing (e.g., tone numerology) of 15 kHz or 30 kHz and non-SYNC subcarrier spacing of 15 kHz, 30 kHz, or 60 kHz. As another example, wireless communications systems using over-6 GHz operating bandwidth may support SYNC subcarrier spacing of 120 kHz or 240 kHz and non-SYNC subcarrier spacing of 60 kHz or 120 kHz. Further, wireless communications systems may support different slot length patterns (e.g., a slot of 7 symbols, 14 symbols, etc.).

Further, a base station (e.g., gNB) may select the SS burst set pattern according to system operating constraints. The base station may then convey the selected SS burst pattern to UEs served by the base station. The base station may convey an indication of the SS burst set pattern information through one or more combinations of PSS, SSS, DMRS of PBCH, PBCH payload (e.g., master information block (MIB)), remaining system information (e.g., SIB-1 and SIB-2), other system information (e.g., other SIBs), radio resource control (RRC) signaling, and/or handover messages. By allowing the base station to select and/or indicate the SS burst set pattern to be used, the wireless communication system may have increased flexibility, including greater scheduling flexibility, and the ability to operate according to a greater number of combinations of numerologies. Such techniques may also allow the wireless communications system to operate with reduced bandwidth or subcarrier spacing.

Aspects of the disclosure are initially described in the context of a wireless communications system. Examples of various SS pattern configurations and SS burst pattern signaling schemes are described. Aspects of the disclosure are further illustrated by and described with reference to apparatus diagrams, system diagrams, and flowcharts that relate to techniques for signaling SS burst set pattern.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed RF spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed RF spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. SSs, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as SSs, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of RF spectrum resources having a defined physical layer structure for supporting communications over a communication link 125. For example, a carrier of a communication link 125 may include a portion of a RF spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., SSs or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a RF spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Synchronization (e.g., cell acquisition) may be performed using SSs or channels transmitted by a network entity (e.g., a base station 105). In some cases, a base station 105 may transmit SS blocks (which may be referred to as SS bursts) containing discovery reference signals. For example, SS blocks may include a PSS, a SSS, a PBCH, or other SSs (e.g., a tertiary synchronization signal (TSS)). In some examples, the signals included in an SS block may include a PSS, an SSS, a PBCH, and/or other SSs that are time division multiplexed. For example, the signals included in an SS block may include a time division multiplexed first PBCH, SSS, second PBCH, and PSS (transmitted in the indicated order), or a time division multiplexed first PBCH, SSS, PSS, and second PBCH (transmitted in the indicated order), etc. In other examples, PBCH transmissions may be transmitted in a subset of SS block time resources (e.g., in two or three symbols of an SS block), and SSs (e.g., primary PSS and SSS) may be transmitted in another subset of SS block time resources (e.g., in two symbols of an SS block). In some cases, PBCH transmissions may be demodulated using SS transmissions, in which the SS transmissions are used for channel estimation, which may allow a UE to demodulate the PBCH transmissions. In some examples, PBCH transmissions may be demodulated using reference signal transmissions, SS transmissions, or combinations thereof.

As discussed above, in some examples base station 105 may transmit SS blocks which may be used by UEs 115 in system acquisition. The SS blocks may include PBCH transmissions and SS transmissions, which may be transmitted in different time resources of an SS block. Furthermore, in deployments that use millimeter wave (mmW) transmission frequencies, multiple SS blocks may be transmitted in different directions using beam sweeping in a SS burst, and SS bursts may be periodically transmitted according to a SS burst set. In cases where a base station 105 may transmit omni-directionally, a SS block may be periodically transmitted according to a configured periodicity. According to techniques described herein, SS blocks or SS burst sets may be transmitted according to SS burst set patterns (e.g., with different slot occupancy patterns which may be defined for different system operating constraints such as operating carrier band, SYNC spacing, data tone spacing, etc.).

Figure 2:
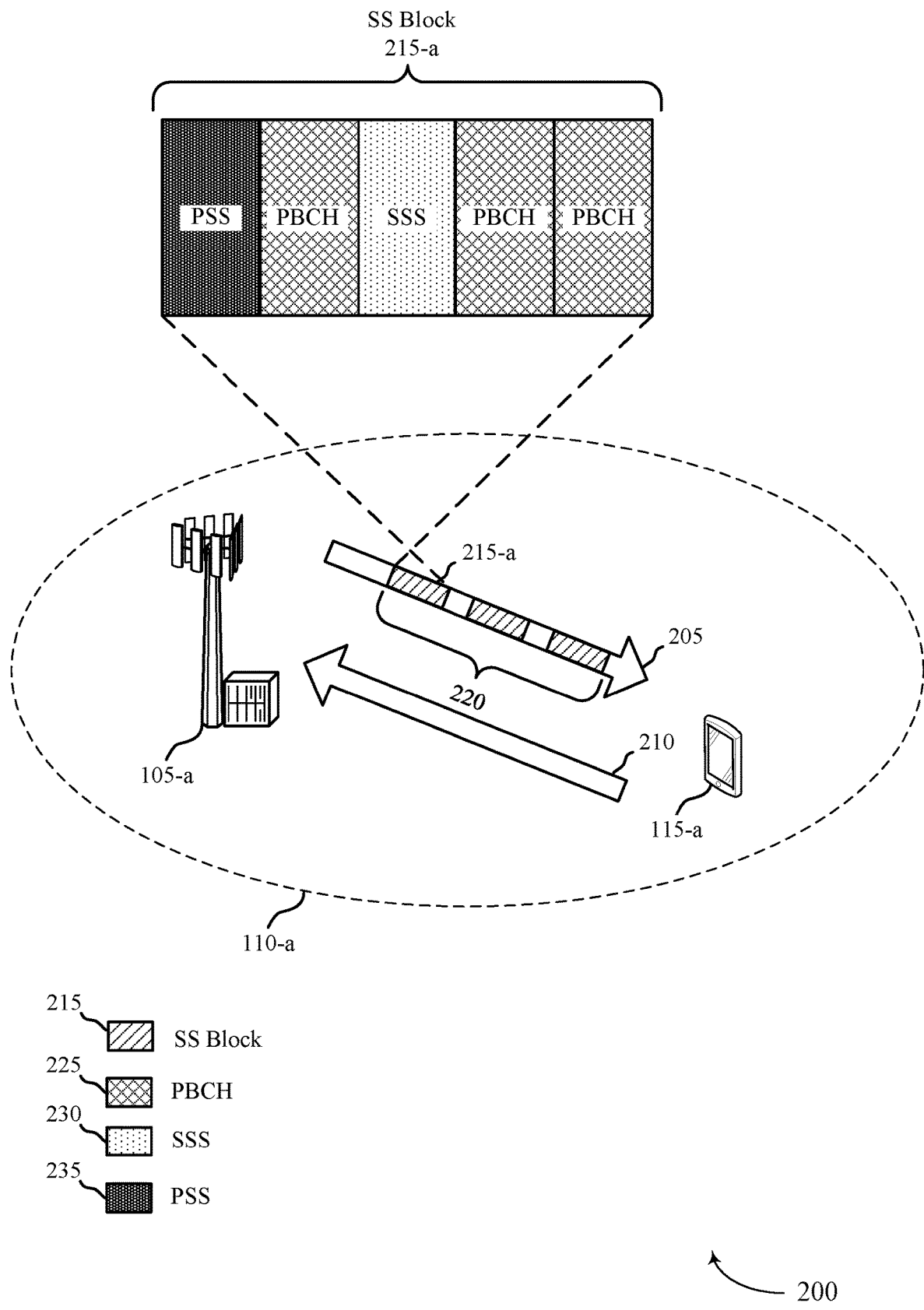
FIG. 2 illustrates an example of a wireless communications system that supports techniques for signaling SS burst set patterns in accordance with aspects of the present disclosure.

FIG. 2 illustrates an example of a wireless communications system 200 that supports techniques for signaling SS burst set pattern in accordance with various aspects of the present disclosure. Wireless communications system 200 includes base station 105-a and UE 115-a, which may be examples of aspects of the corresponding devices as described above with reference to FIG. 1. In the example of FIG. 2, the wireless communications system 200 may operate according to a radio access technology (RAT) such as a LTE, 5G, or NR RAT, although techniques described herein may be applied to any RAT and to systems that may concurrently use two or more different RATs.

Base station 105-a may communicate with UE 115-a over downlink communications 205 and uplink communications 210. In some cases, base station 105-a may allocate resources for SS block 215 transmissions, which may be transmitted according to a SS burst set pattern 220 and may be used by UE 115-a for system acquisition. In some cases, the SS burst set pattern 220 of the SS blocks 215 may be configured by the base station 105-a (e.g., the base station 105-a may determine a SS burst set pattern 220 or the identify a predetermined SS burst set pattern 220 based on system constraints) and information related to the timing or configuration of the SS blocks 215 may be provided with the SS blocks 215 (e.g., base station 105-a may indicate the SS burst pattern 220 to UE 115-a via a PBCH payload of SS block 215-a).

In other examples, SS burst set patterns may be predefined or configured by the network (e.g., based on SS numerology and data numerology, subcarrier spacing, or symbol duration associated with SSs and data transmissions for wireless communications system 200). In such cases, base station 105-a may indicate one or more combinations of synchronization numerology (e.g., SS block numerology) and data numerology to the UE 115-a via PSS, SSS, PBCH, DMRS of PBCH, MIB, SIB, PDCCH, RRC signaling, or a handover message. After identifying SS numerology and data numerology, the UE 115-a may implicitly derive or determine the SS burst set pattern.

In some cases, base station 105-a may use beam sweeping to transmit SS bursts (e.g., base station 105-a may transmit using mmW frequencies) and SS blocks 215 may be transmitted using beam sweeping. In examples that use mmW frequencies and/or beam sweeping, downlink communications 205 may include a SS burst, which may include a number of SS blocks 215 that may be transmitted using different transmission beams in a beam sweep pattern, starting with a first SS block 215-*a* transmitted in a first direction, and ending with an N−1th SS block 215 transmitted in an N−1th direction. SS burst set patterns, as discussed herein, may refer to a pattern or ordering of an entire SS burst or, in other cases, portions of an SS burst (e.g., a SS burst set pattern may indicate a pattern for an SS burst, or some selected SS blocks).

In some examples the PBCH transmissions 225 may have a larger frequency bandwidth than SSS transmission 230 or PSS transmission 235, although the frequency bandwidths may be the same in other examples (e.g., when a PBCH bandwidth constraint is identified). In cases where a PBCH bandwidth constraint exists (e.g., cases where the PBCH transmissions 225, SSS transmission 230, and PSS transmission 235 frequency bandwidths are the same), additional symbols may be included in SS blocks 215, as additional symbols may be used to convey PBCH payload information. In the present example, each of the SS blocks 215 may include five symbols. Three of the symbols may include PBCH transmissions 225 (e.g., a PBCH payload). The other two symbols may include SS transmissions, such as an SSS transmission 230 and a PSS transmission 235. The following figures may illustrate example SS burst set patterns for SS blocks that include 5 symbols. According to techniques described herein, the above description and following example SS burst patterns may be extended to scenarios of different carrier bandwidths, different PBCH bandwidth constraints, different SS block sizes (e.g., SS blocks including 4 symbols, 6 symbols, 7 symbols, etc.), different SS subcarrier spacings, different data subcarrier spacings, different gap symbol implementation requirements, etc. by analogy, without departing from the scope of the present disclosure.

Figure 3:
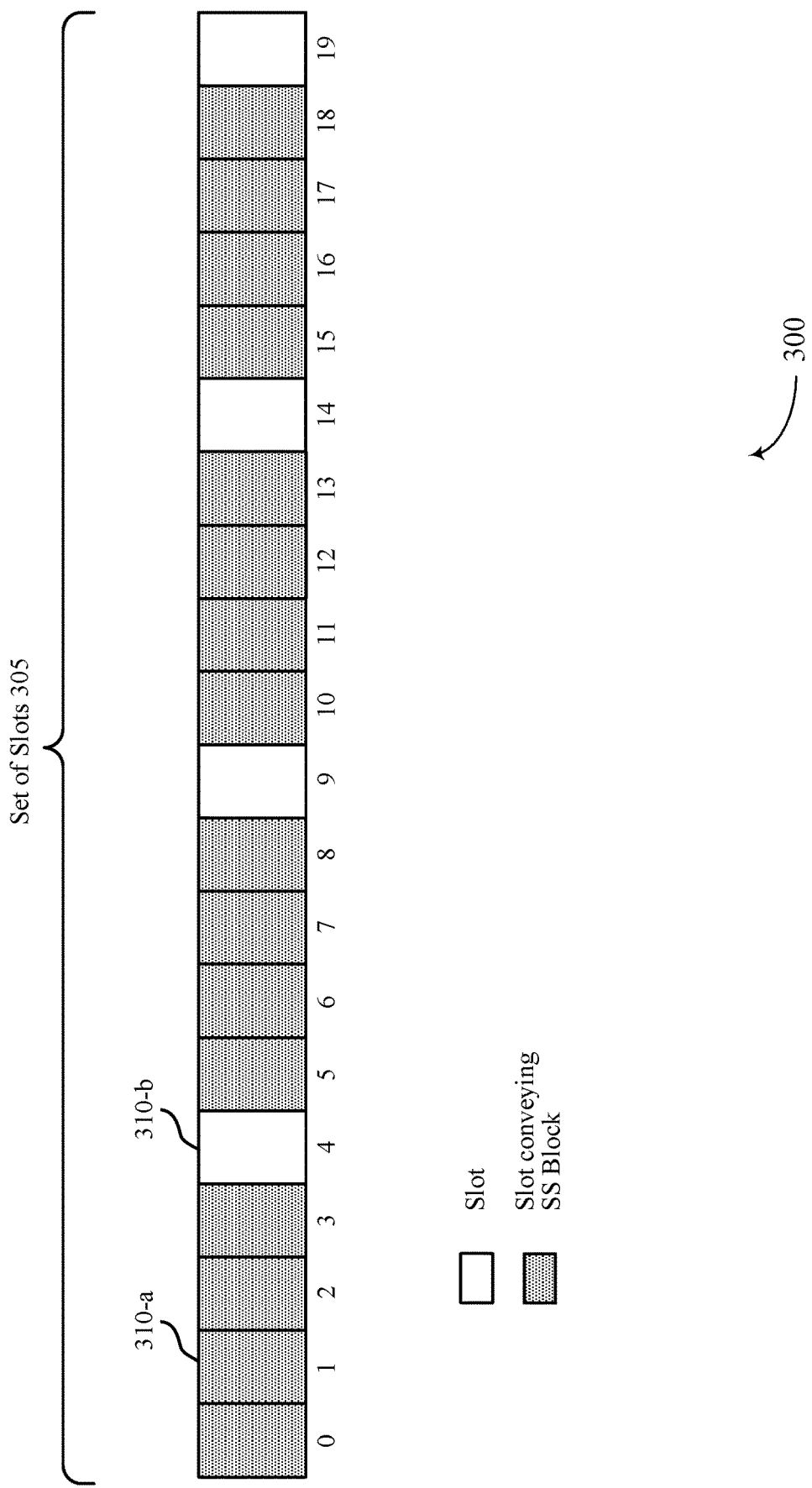
FIG. 3 illustrates an example of a set of slots that supports techniques for signaling SS burst set patterns in accordance with aspects of the present disclosure.

FIG. 3 illustrates an example of a set of slots 300 that support techniques for signaling an SS burst set pattern in accordance with various aspects of the present disclosure. In some examples, set of slots 300 may implement aspects of wireless communications systems 100 or wireless communications systems 200 as described with reference to FIGS. 1 and 2. In the example, of FIG. 3, a set of slots 300 may be identified by a base station (e.g., a base station may configure the SS burst set pattern, or the base station may identify a preconfigured pattern based on numerology as discussed above). In this example, the set of slots 300 may indicate a slot occupancy pattern for a set of slots 305. That is, the set of slots 300 may indicate which slots 310 of the set of slots 305 contain SS blocks. For example, set of slots 300 may indicate that slot 310-*a* may include a SS block and slot 310-*b* may be empty, or available for other purposes. In the present example, the set of slots 300 may indicate slots 0-3, 5-8, 10-13, and 15-18 may contain SS blocks, while slots 4, 9, 14, and 19 do not contain SS blocks, and may be available for other purposes. FIG. 3 is one example of an SS burst set pattern, and other SS burst set patterns may indicate different slot occupancy patterns for sets of slots of different sizes (e.g., for sets of slots that include different numbers of slots, slots each having a different number of symbols), without departing from the scope of the present disclosure.

Figure 4:
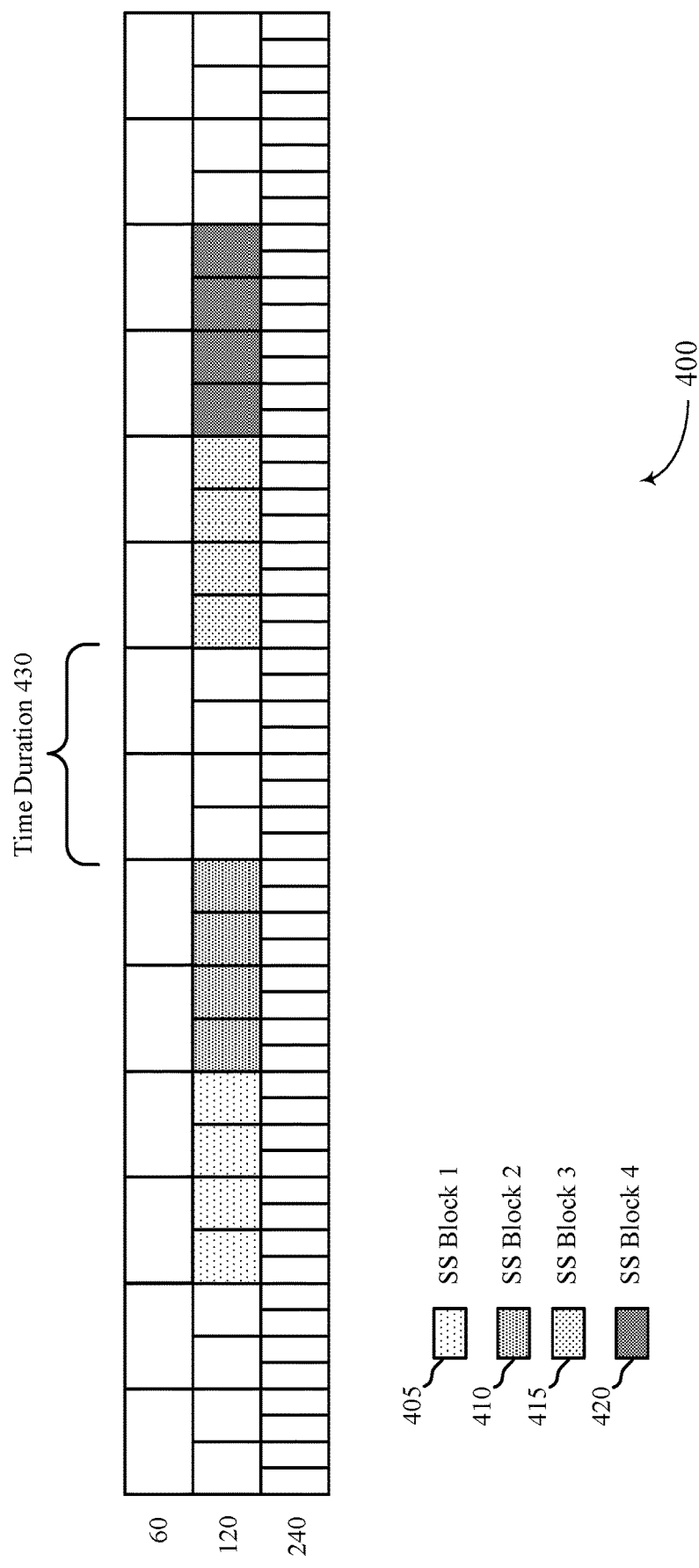
FIG. 4 illustrates an example of a SS burst set pattern that supports techniques for signaling SS burst set patterns in accordance with aspects of the present disclosure.

FIG. 4 illustrates an example of a SS burst set pattern 400 that support techniques for signaling SS burst set pattern in accordance with various aspects of the present disclosure. In some examples, SS burst set pattern 400 may implement aspects of wireless communications systems 100 or wireless communications systems 200 as described with reference to FIGS. 1 and 2. In the example of FIG. 4, a SS burst set pattern 400 may be identified by a base station and/or a UE. In this example, the SS burst set pattern 400 may indicate position of one or more SS blocks within one or more slots (e.g., SS burst set pattern 400 may indicate which symbols include SS block information within one or more slots). In the following description, each slot may include 7 symbols (e.g., each rectangle may represent a symbol for the respective subcarrier spacing or numerology), and each slot may span a different duration of time (e.g., depending on the numerology). For example, a time duration 430 may include two 60 kHz symbols, four 120 kHz symbols, or eight 240 kHz symbols, depending on the numerology used. According to techniques described herein, an SS burst set pattern may be identified based on the synchronization or SS block numerology, as well as the numerology used for data/control transmissions.

In the present example, each SS block may include 4 symbols, and the SS burst set pattern 400 may include symbol locations for four SS blocks. Further, the SS burst set pattern may be identified on the basis of SS blocks using a 120 kHz subcarrier spacing (which may define or indicate the numerology used for the SS blocks).

Figure 5:
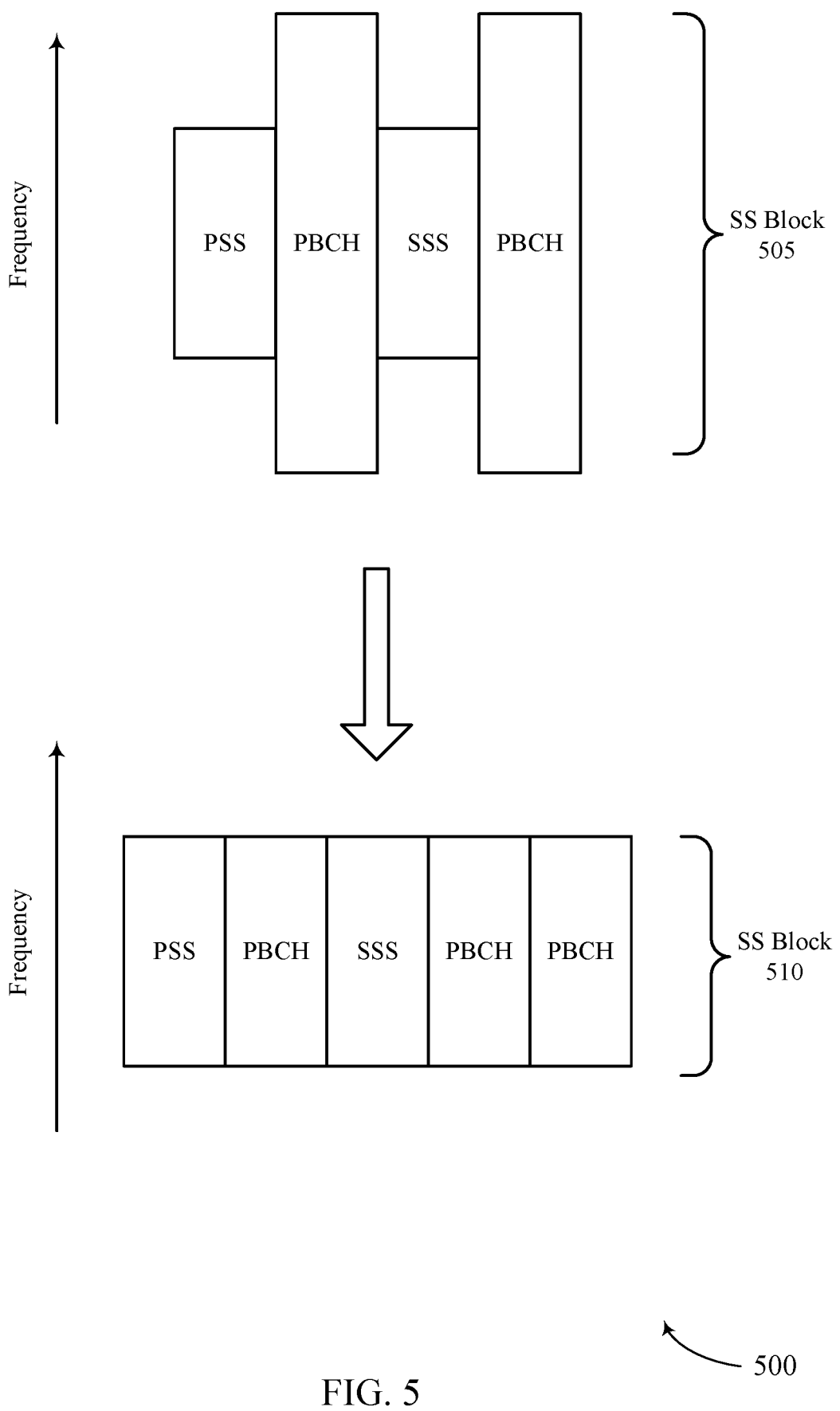
FIG. 5 illustrates an example of an SS block configuration that supports techniques for signaling SS burst set patterns in accordance with aspects of the present disclosure.

FIG. 5 may illustrate examples of an SS block configuration 500 that support techniques for signaling SS burst set pattern in accordance with various aspects of the present disclosure. In some examples, SS block configuration 500 may implement aspects of wireless communications systems 100 or wireless communications systems 200 as described with reference to FIGS. 1 and 2. As discussed above, SS blocks may include symbols for PSS, SSS, and PBCH payload information. In some cases, bandwidth restrictions (e.g., PBCH bandwidth constraints) may determine or affect how may symbols may be included in an SS block (e.g., how many symbols are needed to convey the necessary PBCH information). For example, SS block 505 may not be associated with any PBCH bandwidth constraints (e.g., or may be associated with relatively flexible PBCH bandwidth constraints) such that PBCH symbols may be transmitted over a larger bandwidth compared to PSS and SSS symbols. In such cases, SS block 505 may include four symbols (e.g., two symbols conveying PBCH information). In cases where PBCH bandwidth constraints exist (e.g., as is the case for SS block 510), additional symbols may be needed to convey the necessary PBCH payload information. For example, SS block 510 may include 5 symbols (e.g., three symbols conveying PBCH information) and all symbols may be transmitted according to the same bandwidth. That is, some carrier frequencies (e.g., associated with SS block 510) may be associated with reduced bandwidth (e.g., which may result in increased number of PBCH symbols to support the necessary PBCH payload). In other examples where bandwidth does not support wideband PBCH, SS blocks may include even more symbols (e.g., 6, 7, etc.) depending on the bandwidth restrictions (e.g., the PBCH bandwidth constraints) and the amount of PBCH payload information.

FIGS. 6A and 6B illustrate examples of SS burst set pattern 600 and SS burst set pattern 601 that support techniques for signaling SS burst set pattern in accordance with various aspects of the present disclosure. In some examples, SS burst set pattern 600 and SS burst set pattern 601 may implement aspects of wireless communications systems 100 or wireless communications systems 200 as described with reference to FIGS. 1 and 2. In the examples, of FIG. 6, SS burst set pattern 600 and/or SS burst set pattern 601 may be identified by a base station and/or a UE. In this example, the SS burst set pattern 600 and the SS burst set pattern 601 may indicate positions of one or more SS blocks within one or more slots (e.g., SS burst set pattern 600 and SS burst set pattern 601 may indicate which symbols include SS block information within one or more slots). In the following description, each slot may include 7 symbols (e.g., each rectangle may represent a symbol for the respective subcarrier spacing or numerology), and each slot may span a different duration of time (e.g., depending on the numerology). For example, a time duration 620 may include two 15 kHz symbols, four 30 kHz symbols, or eight 60 kHz symbols, depending on the numerology used. According to techniques described herein, an SS burst set pattern may be identified based on the RF band, the synchronization or SS block numerology, as well as the numerology used for data/control transmissions. In the present example, each SS block may include 5 symbols, and the SS burst set pattern 600 and the SS burst set pattern 601 may include symbol locations for two SS blocks. Further, the SS burst set patterns of FIGS. 6A and 6B may be identified on the basis of SS blocks using a 15 kHz subcarrier spacing (which may define or indicate the numerology used for the SS blocks).

For example, a base station may identify or select SS burst set pattern 600 if data/control transmissions use a 15 kHz subcarrier spacing. SS burst set pattern 600 may be selected based on this data/control numerology in order to preserve two symbols (e.g., two 15 kHz symbols) for downlink control at the beginning of the 15 kHz slot, as well as to preserve two symbols at the end of the slot of fourteen symbols for uplink control. That is, SS burst set pattern 600 may allow for two available 15 kHz symbols (e.g., over time duration 620) for a downlink control region, as well as two available 15 kHz symbols (e.g., over time duration 625) for a guard period or an uplink control region in scenarios where data/control transmissions use a 15 kHz subcarrier spacing. That is, SS burst set pattern 600 may include or identify an ordering of two empty or available 15 kHz symbols for control/data, followed by five 15 kHz symbols for SS block 1, followed by five 15 kHz symbols for SS block 2, followed by two empty or available 15 kHz symbols for control/data.

By extension, a base station may identify or select SS burst set pattern 601 if data/control transmissions use a 30 kHz subcarrier spacing. That is, if control/data transmissions use a numerology associated with 30 kHz subcarrier spacing and synchronization transmission (e.g., SS blocks) use a numerology associated with 15 kHz subcarrier spacing, SS burst set pattern 601 may be implemented. SS burst set pattern 601 may allow two preserved 30 kHz symbols (e.g., over time duration 630) for uplink control and two preserved 30 kHz symbols (e.g., over time duration 635) for uplink control or guard period. The subsequent slot may also allow two preserved 30 kHz symbols (e.g., over time duration 640) for uplink control and two preserved 30 kHz symbols (e.g., over time duration 645) for uplink control or guard period. That is, SS burst set pattern 601 may include or identify an ordering of two empty or available 30 kHz symbols for control/data, followed by five 15 kHz symbols for SS block 1, followed by four 30 kHz symbols for a gap (e.g., control/data), followed by five 15 kHz symbols for SS block 2, followed by two empty or available 30 kHz symbols for control/data.

FIGS. 7A and 7B illustrate examples of SS burst set pattern 700 and SS burst set pattern 701 that support techniques for signaling SS burst set pattern in accordance with various aspects of the present disclosure. In some examples, SS burst set pattern 700 and SS burst set pattern 701 may implement aspects of wireless communications systems 100 or wireless communications systems 200 as described with reference to FIGS. 1 and 2. In the examples, of FIG. 7, SS burst set pattern 700 and/or SS burst set pattern 701 may be identified by a base station and/or a UE. In this example, the SS burst set pattern 700 and the SS burst set pattern 701 may indicate positions of one or more SS blocks within one or more slots (e.g., SS burst set pattern 700 and SS burst set pattern 701 may indicate which symbols include SS block information within one or more slots). In the following description, each slot may include 7 symbols (e.g., each rectangle may represent a symbol for the respective subcarrier spacing or numerology), and each slot may span a different duration of time (e.g., depending on the numerology). For example, a time duration 730 may include one 15 kHz symbol, two 30 kHz symbols, or four 60 kHz symbols, depending on the numerology used. According to techniques described herein, an SS burst set pattern may be identified based on the RF band, the synchronization or SS block numerology, as well as the numerology used for data/control transmissions. In the present example, each SS block may include 5 symbols, and the SS burst set pattern 700 and the SS burst set pattern 701 may include symbol locations for four SS blocks. Further, the SS burst set patterns of FIGS. 7A and 7B may be identified on the basis of SS blocks using a 30 kHz subcarrier spacing (which may define or indicate the numerology used for the SS blocks).

For example, a base station may identify or select SS burst set pattern 700 if data/control transmissions use a 30 kHz subcarrier spacing. SS burst set pattern 700 may be selected based on this data/control numerology in order to preserve two symbols (e.g., two 30 kHz symbols) for downlink control at the beginning of the 30 kHz slot, to preserve a gap of symbols, as well as to preserve two symbols at the end of the slot of fourteen 15 kHz symbols for uplink control. That is, SS burst set pattern 700 may allow for two available 30 kHz symbols (e.g., over time duration 730) for a downlink control region, a gap of four 30 kHz symbols (e.g., over time duration 735), as well as two available 30 kHz symbols (e.g., over time duration 740) for a guard period or an uplink control region in scenarios where data/control transmissions use a 30 kHz subcarrier spacing. That is, SS burst set pattern 700 may include or identify an ordering of two empty or available 30 kHz symbols for control/data, followed by five 30 kHz symbols for SS block 1, followed by five 30 kHz symbols for SS block 2, followed by four 30 kHz symbols for a gap (e.g., for control/data), followed by five 30 kHz symbols for SS block 3, followed by five 30 kHz symbols for SS block 4, followed by two empty or available 30 kHz symbols for control/data.

By extension, a base station may identify or select SS burst set pattern 701 if data/control transmissions use a 15 kHz subcarrier spacing. That is, if control/data transmissions use a numerology associated with 15 kHz subcarrier spacing and synchronization transmission (e.g., SS blocks) use a numerology associated with 30 kHz subcarrier spacing, SS burst set pattern 701 may be implemented. SS burst set pattern 701 may allow two preserved 15 kHz symbols (e.g., over time duration 745) for uplink control and two preserved 15 kHz symbols (e.g., over time duration 750) for uplink control or guard period. That is, SS burst set pattern 701 may include or identify an ordering of two empty or available 15 kHz symbols for control/data, followed by five 30 kHz symbols for SS block 1, followed by five 30 kHz symbols for SS block 2, followed by five 30 kHz symbols for SS block 3, followed by five 30 kHz symbols for SS block 4, followed by two empty or available 15 kHz symbols for control/data.

Figure 8:
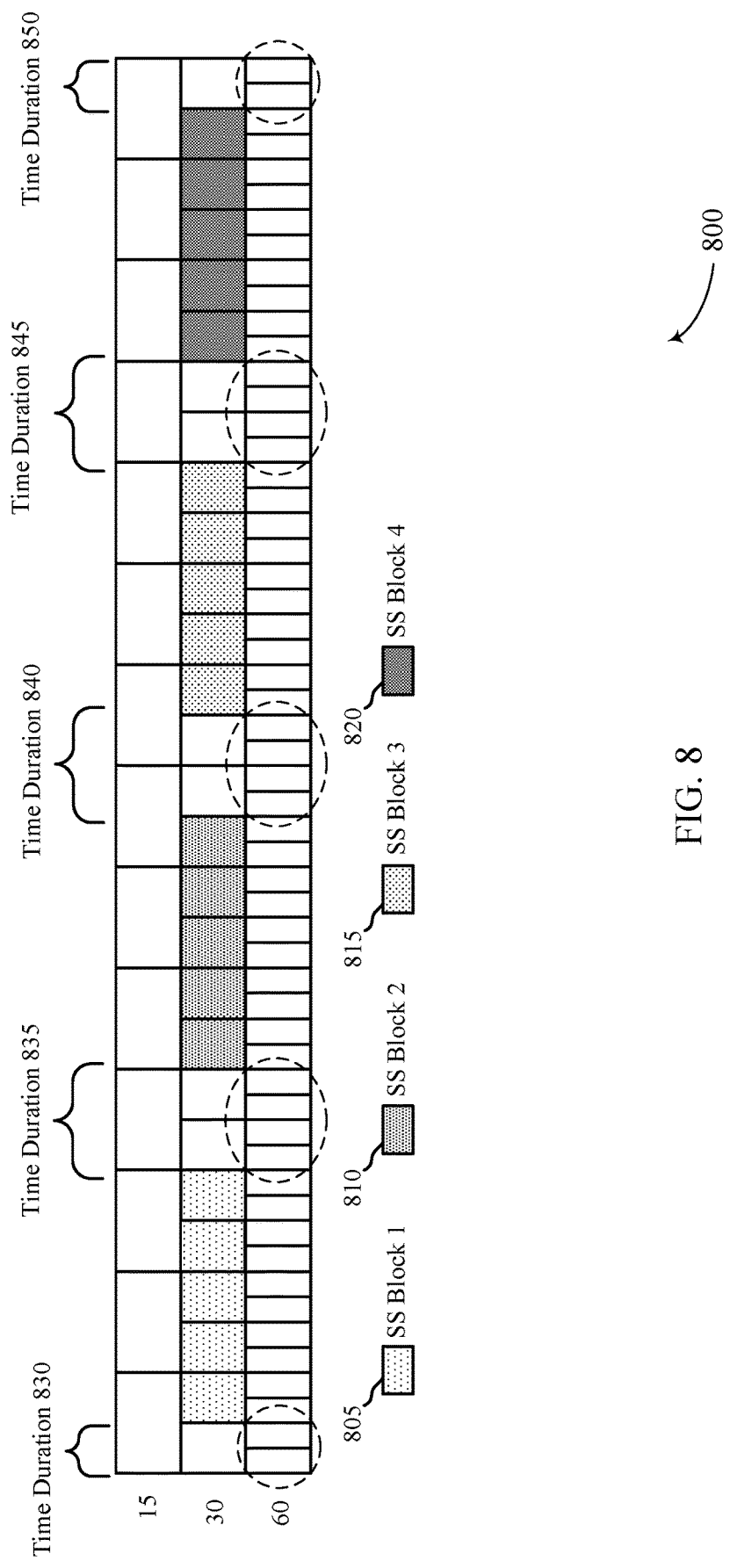

FIG. 8 illustrates an example of a SS burst set pattern 800 that supports techniques for signaling SS burst set pattern in accordance with various aspects of the present disclosure. In some examples, SS burst set pattern 800 may implement aspects of wireless communications systems 100 or wireless communications systems 200 as described with reference to FIGS. 1 and 2. In the example, of FIG. 8, SS burst set pattern 800 may be identified by a base station and/or a UE. In this example, the SS burst set pattern 800 may indicate positions of one or more SS blocks within one or more slots (e.g., SS burst set pattern 800 may indicate which symbols include SS block information within one or more slots). In the following description, each slot may include 7 symbols (e.g., each rectangle may represent a symbol for the respective subcarrier spacing or numerology), and each slot may span a different duration of time (e.g., depending on the numerology). For example, a time duration 830 may include half of a 15 kHz symbol, one 30 kHz symbol, or two 60 kHz symbols, depending on the numerology used. According to techniques described herein, an SS burst set pattern may be identified based on the RF band, the synchronization or SS block numerology, as well as the numerology used for data/control transmissions. In the present example, each SS block may include 5 symbols, and the SS burst set pattern 800 may include symbol locations for four SS blocks. Further, the SS burst set pattern of FIG. 8 may be identified on the basis of SS blocks using a 30 kHz subcarrier spacing (which may define or indicate the numerology used for the SS blocks).

For example, a base station may identify or select SS burst set pattern 800 if data/control transmissions use a 60 kHz subcarrier spacing. SS burst set pattern 700 may be selected based on this data/control numerology in order to preserve two symbols (e.g., two 60 kHz symbols) for downlink control at the beginning of the 30 kHz slot, to preserve a gap of symbols, as well as to preserve two symbols at the end of the slot of fourteen 15 kHz symbols for uplink control. That is, SS burst set pattern 800 may allow for two available 60 kHz symbols (e.g., over time duration 830) for a downlink control region, a gap of four 60 kHz symbols (e.g., over time duration 835), a gap of four 60 kHz symbols (e.g., over time duration 840), a gap of four 60 kHz symbols (e.g., over time duration 845), as well as two available 60 kHz symbols (e.g., over time duration 850) for a guard period or an uplink control region in scenarios where data/control transmissions use a 60 kHz subcarrier spacing. That is, SS burst set pattern 800 may include or identify an ordering of two empty or available 60 kHz symbols for control/data, followed by five 30 kHz symbols for SS block 1, followed by four 60 kHz symbols for a gap (e.g., for control/data), followed by five 30 kHz symbols for SS block 2, followed by four 60 kHz symbols for a gap (e.g., for control/data), followed by five 30 kHz symbols for SS block 3, followed by four 60 kHz symbols for a gap (e.g., for control/data), followed by five 30 kHz symbols for SS block 4, followed by two empty or available 60 kHz symbols for control/data.

FIGS. 9A and 9B illustrate examples of SS burst set pattern 900 and SS burst set pattern 901 that support techniques for signaling SS burst set pattern in accordance with various aspects of the present disclosure. In some examples, SS burst set pattern 900 and SS burst set pattern 901 may implement aspects of wireless communications systems 100 or wireless communications systems 200 as described with reference to FIGS. 1 and 2. In the examples, of FIG. 9, SS burst set pattern 900 and/or SS burst set pattern 901 may be identified by a base station and/or a UE. In this example, the SS burst set pattern 900 and the SS burst set pattern 901 may indicate positions of one or more SS blocks within one or more slots (e.g., SS burst set pattern 900 and SS burst set pattern 901 may indicate which symbols include SS block information within one or more slots). In the following description, each slot may include 7 symbols (e.g., each rectangle may represent a symbol for the respective subcarrier spacing or numerology), and each slot may span a different duration of time (e.g., depending on the numerology). For example, a time duration 930 may include one 60 kHz symbol, two 120 kHz symbols, or four 240 kHz symbols, depending on the numerology used. According to techniques described herein, an SS burst set pattern may be identified based on the RF band, the synchronization or SS block numerology, as well as the numerology used for data/control transmissions. In the present example, each SS block may include 5 symbols, and the SS burst set pattern 900 and the SS burst set pattern 901 may include symbol locations for four SS blocks. Further, the SS burst set patterns of FIGS. 9A and 9B may be identified on the basis of SS blocks using a 120 kHz subcarrier spacing (which may define or indicate the numerology used for the SS blocks).

For example, a base station may identify or select SS burst set pattern 900 if data/control transmissions use a 120 kHz subcarrier spacing. SS burst set pattern 900 may be selected based on this data/control numerology in order to preserve two symbols (e.g., two 120 kHz symbols) for downlink control at the beginning of the 60 kHz slot, to preserve a gap of symbols, as well as to preserve two symbols at the end of the slot of fourteen 60 kHz symbols for uplink control. That is, SS burst set pattern 900 may allow for two available 120 kHz symbols (e.g., over time duration 930) for a downlink control region, a gap of four 120 kHz symbols (e.g., over time duration 935), as well as two available 120 kHz symbols (e.g., over time duration 940) for a guard period or an uplink control region in scenarios where data/control transmissions use a 120 kHz subcarrier spacing. That is, SS burst set pattern 900 may include or identify an ordering of two empty or available 120 kHz symbols for control/data, followed by five 120 kHz symbols for SS block 1, followed by five 120 kHz symbols for SS block 2, followed by four 120 kHz symbols for a gap (e.g., for control/data), followed by five 120 kHz symbols for SS block 3, followed by five 120 kHz symbols for SS block 4, followed by two empty or available 120 kHz symbols for control/data.

By extension, a base station may identify or select SS burst set pattern 901 if data/control transmissions use a 60 kHz subcarrier spacing. That is, if control/data transmissions use a numerology associated with 60 kHz subcarrier spacing and synchronization transmission (e.g., SS blocks) use a numerology associated with 120 kHz subcarrier spacing, SS burst set pattern 901 may be implemented. SS burst set pattern 901 may allow two preserved 60 kHz symbols (e.g., over time duration 945) for uplink control and two preserved 60 kHz symbols (e.g., over time duration 950) for uplink control or guard period. That is, SS burst set pattern 901 may include or identify an ordering of two empty or available 60 kHz symbols for control/data, followed by five 120 kHz symbols for SS block 1, followed by five 120 kHz symbols for SS block 2, followed by five 120 kHz symbols for SS block 3, followed by five 120 kHz symbols for SS block 4, followed by two empty or available 60 kHz symbols for control/data.

FIGS. 10A and 10B illustrate examples of SS burst set pattern 1000 and SS burst set pattern 1001 that support techniques for signaling SS burst set pattern in accordance with various aspects of the present disclosure. In some examples, SS burst set pattern 1000 and SS burst set pattern 1001 may implement aspects of wireless communications systems 100 or wireless communications systems 200 as described with reference to FIGS. 1 and 2. In the examples, of FIG. 10, SS burst set pattern 1000 and/or SS burst set pattern 1001 may be identified by a base station and/or a UE. In this example, the SS burst set pattern 1000 and the SS burst set pattern 1001 may indicate positions of one or more SS blocks within one or more slots (e.g., SS burst set pattern 1000 and SS burst set pattern 1001 may indicate which symbols include SS block information within one or more slots). In the following description, each slot may include 7 symbols (e.g., each rectangle may represent a symbol for the respective subcarrier spacing or numerology), and each slot may span a different duration of time (e.g., depending on the numerology). For example, a time duration 1050 may include two 60 kHz symbol, four 120 kHz symbols, or eight 240 kHz symbols, depending on the numerology used. According to techniques described herein, an SS burst set pattern may be identified based on the RF band, the synchronization or SS block numerology, as well as the numerology used for data/control transmissions. In the present example, each SS block may include 5 symbols, and the SS burst set pattern 1000 and the SS burst set pattern 1001 may include symbol locations for eight SS blocks. Further, the SS burst set patterns of FIGS. 10A and 10B may be identified on the basis of SS blocks using a 240 kHz subcarrier spacing (which may define or indicate the numerology used for the SS blocks).

For example, a base station may identify or select SS burst set pattern 1000 if data/control transmissions use a 60 kHz subcarrier spacing. SS burst set pattern 1000 may be selected based on this data/control numerology in order to preserve two symbols (e.g., two 60 kHz symbols) for downlink control at the beginning of the 60 kHz slot, as well as to preserve two symbols at the end of the slot of fourteen 60 kHz symbols for uplink control. That is, SS burst set pattern 1000 may allow for two available 60 kHz symbols (e.g., over time duration 1050) for a downlink control region, as well as two available 60 kHz symbols (e.g., over time duration 1055) for a guard period or an uplink control region in scenarios where data/control transmissions use a 60 kHz subcarrier spacing. That is, SS burst set pattern 1000 may include or identify an ordering of two empty or available 60 kHz symbols for control/data, followed by five 240 kHz symbols for SS block 1 1005, followed by five 240 kHz symbols for SS block 2, followed by five 240 kHz symbols for SS block 3, followed by five 240 kHz symbols for SS block 4, followed by five 240 kHz symbols for SS block 5, followed by five 240 kHz symbols for SS block 6, followed by five 240 kHz symbols for SS block 7, followed by five 240 kHz symbols for SS block 8, followed by two empty or available 60 kHz symbols for control/data.

By extension, a base station may identify or select SS burst set pattern 1001 if data/control transmissions use a 120 kHz subcarrier spacing. That is, if control/data transmissions use a numerology associated with 120 kHz subcarrier spacing and synchronization transmission (e.g., SS blocks) use a numerology associated with 240 kHz subcarrier spacing, SS burst set pattern 1001 may be implemented. SS burst set pattern 1001 may allow two preserved 120 kHz symbols (e.g., over time duration 1060) for uplink control, a gap of four 120 kHz symbols (e.g., over time duration 1065), and two preserved 120 kHz symbols (e.g., over time duration 1070) for uplink control or guard period. That is, SS burst set pattern 1001 may include or identify an ordering of two empty or available 120 kHz symbols for control/data, followed by five 240 kHz symbols for SS block 1, followed by five 240 kHz symbols for SS block 2, followed by five 240 kHz symbols for SS block 3, followed by five 240 kHz symbols for SS block 4, followed by four 120 kHz symbols for a gap (e.g., for uplink control, downlink control, guard period, etc.), followed by five 240 kHz symbols for SS block 5, followed by five 240 kHz symbols for SS block 6, followed by five 240 kHz symbols for SS block 7, followed by five 240 kHz symbols for SS block 8, followed by two empty or available 60 kHz symbols for control/data.

Figure 11:
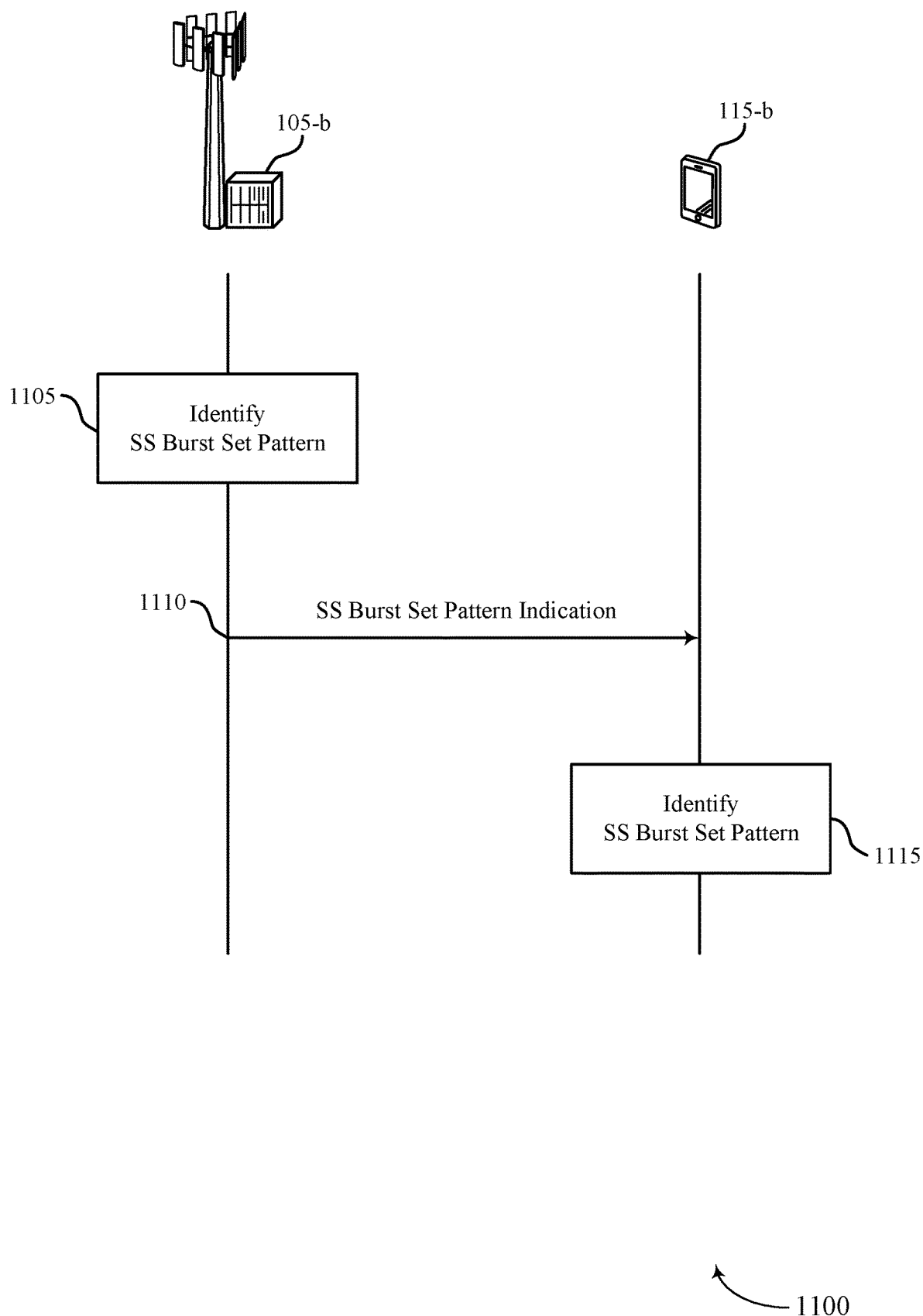
FIG. 11 illustrates an example of a process flow that supports techniques for signaling SS burst set patterns in accordance with aspects of the present disclosure.

FIG. 11 illustrates an example of a process flow 1100 in a system employing techniques for signaling SS burst set patterns in accordance with various aspects of the present disclosure. In some examples, process flow 1100 may implement aspects of wireless communications system 100 and wireless communications system 200 as described with reference to FIGS. 1 and 2. For example, process flow 1100 may include a UE 115-b and a base station 105-b, which may be examples of the corresponding devices described with reference to FIGS. 1 and 2. Process flow 1100 may illustrate an example of signaling, sent from base station 105-b to UE 115-b, that indicates a SS burst set pattern, such that UE 115-b may monitor for SS blocks, control signaling, data transmissions, etc., accordingly.

At 1105, base station 105-b may identify a SS burst set pattern. The SS burst set pattern may indicate positions of one or more SS blocks (e.g., one or more sets of SS blocks). Identifying the SS burst set pattern may include identifying a time location (e.g., a symbol, or a slot, and/or a radio frame location) of the SS blocks within the SS burst set pattern. In some cases, the SS burst set pattern may be identified based on an identified subcarrier spacing of SSs and/or an identified subcarrier spacing of non-SSs (e.g., data, control, etc.).

At 1110, base station 105-b may transmit an indication of the SS burst set pattern identified at 1105. For example, base station 105-b may transmit the indication via a PSS, SSS, DMRS of a PBCH, a PBCH payload, MIB, SIB, RRC transmission, a handover message, etc. In some cases, the indication may indicate numerology used for SSs and/or non-SSs, and the UE, at 1115, may implicitly derive the SS burst set pattern.

At 1115, UE 115-b may identify the SS burst set pattern (e.g., the slot occupancy pattern) based at least in part on the received indication. In some cases, identifying the SS burst set pattern may include identifying positions to monitor for SS blocks, identifying positions to monitor for downlink control information (e.g., in one or two symbols of the slot prior to the positions monitored for the SS blocks), and/or identifying positions to transmit uplink control information (e.g., in one or two symbols of a slot after the positions in the slot monitored for the SS blocks). In some cases (e.g., according to some SS burst set patterns), UE 115-b may further identify a guard period between two or more sets of SS blocks of the SS burst set pattern. In some cases, the indication of 1110 may be sent in random mobile subscriber identity (RMSI), in which case the UE 115-b may receive the SS blocks prior to receiving the indication (e.g., the order of steps 1110 and 1115 may be switched).

Figure 12:
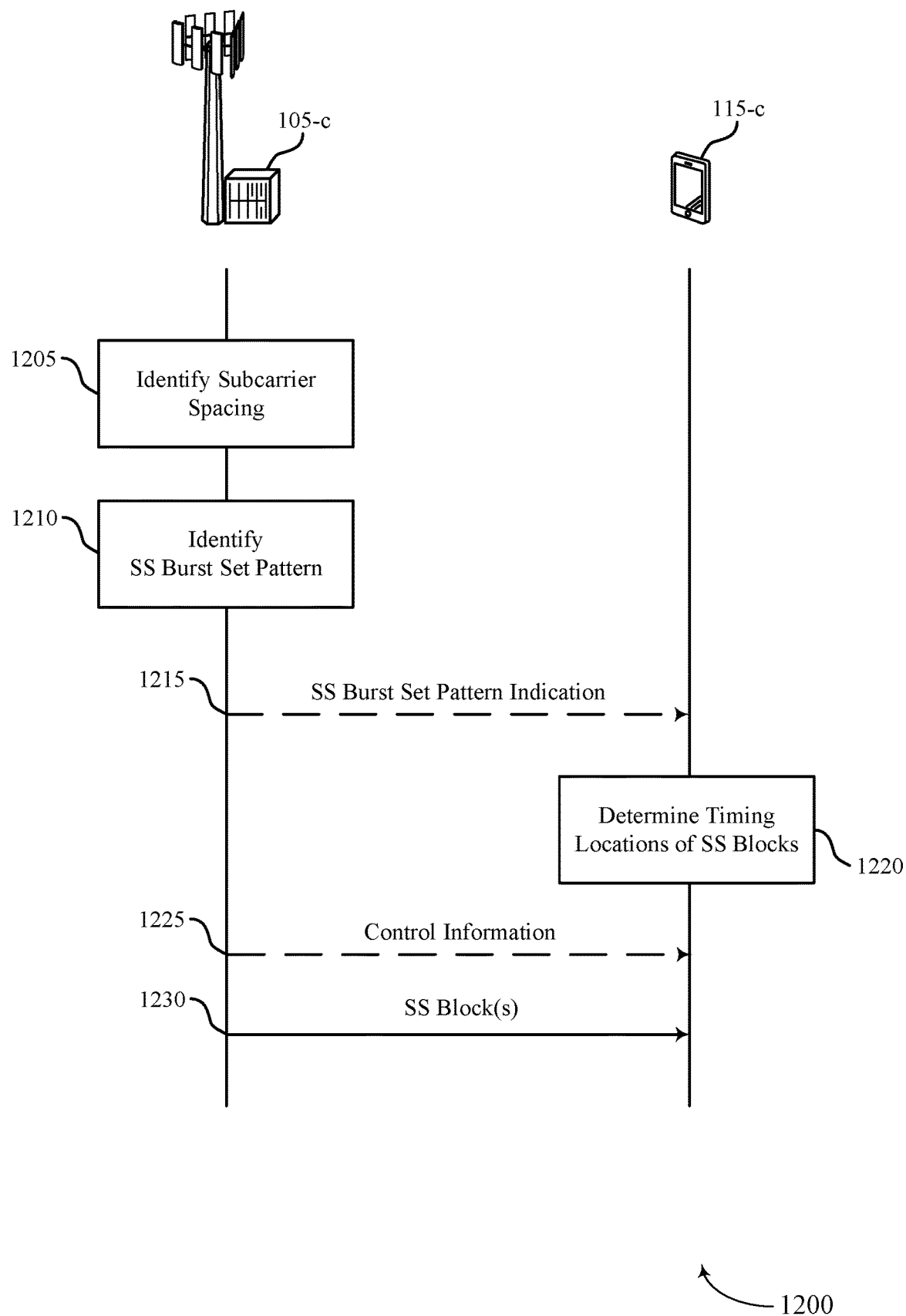
FIG. 12 illustrates an example of a process flow that supports techniques for signaling SS burst set patterns in accordance with aspects of the present disclosure.

FIG. 12 illustrates an example of a process flow 1200 in a system employing techniques for signaling SS burst set patterns in accordance with various aspects of the present disclosure. In some examples, process flow 1200 may implement aspects of wireless communications system 100 and wireless communications system 200 as described with reference to FIGS. 1 and 2. For example, process flow 1200 may include a UE 115-c and a base station 105-c, which may be examples of the corresponding devices described with reference to FIGS. 1 and 2. Process flow 1200 may illustrate an example of signaling, sent from base station 105-c to UE 115-c, that indicates a SS burst set pattern, such that UE 115-c may monitor for SS blocks, control signaling, data transmissions, etc., accordingly.

At 1205, base station 105-c may identify a subcarrier spacing (e.g., base station 105-c may identify a SYNC numerology and a data/control numerology) to be used in communications with UE 115-c.

At 1210, base station 105-c may identify a SS burst set pattern based on the numerology or subcarrier spacing identified at 1205. The SS burst set pattern may indicate positions of one or more SS blocks (e.g., one or more sets of SS blocks). Identifying the SS burst set pattern may include identifying a time location (e.g., a symbol, or a slot, or a radio frame location) of the SS blocks within the SS burst set pattern.

At 1215, base station 105-c may optionally transmit a SS burst set pattern indication to UE 115-c (e.g., in some cases, an indication of numerology being used may be transmitted at 1215). For example, base station 105-b may transmit the indication via a PSS, SSS, DMRS of a PBCH, a PBCH payload, MIB, SIB, RRC transmission, a handover message, etc. In some cases, the indication may indicate numerology used for SSs and/or non-SSs, and the UE, at 1115, may implicitly derive the SS burst set pattern. In some cases, the SS burst set pattern may indicate a slot occupancy pattern (e.g., one or more slots of a set of slots that contain SS blocks) and/or symbols within the occupied slots that contain SS block information.

At 1220, UE 115-c may determine timing locations of SS blocks. In some cases, determining the timing locations may refer to UE 115-c identifying a SS burst set pattern. As discussed above (e.g. and described in more detail with reference to FIG. 2), UE 115-c may, in some cases, implicitly derive the timing locations of SS blocks (e.g., the SS burst set pattern) from an indication of numerology being used by the wireless communications system (e.g., in cases where an indication of numerology being used is transmitted at 1215). For example, SS burst set patterns may be pre-configured by the network, such that an indication of numerology being used (e.g., for SYNC and data transmissions) may imply an SS burst set pattern, for example the SS burst set pattern to be used based on the numerology or numerologies to be used (for SYNC and data transmissions).

At 1225, base station 105-c may optionally transmit control information (e.g., downlink control information in empty or available symbols included at the beginning of a slot, prior to SS blocks, according to the SS burst set pattern). For example, according to some SS burst set patterns that may be identified at 1210, base station 105-c may transmit downlink control information in one or two symbols of the slot prior to the positions used for transmission of the SS blocks.

At 1230, base station 105-c may transmit one or more SS blocks according to the SS burst set pattern. Additionally, UE 115-c may monitor for the one or more SS blocks according to the SS burst set pattern (e.g., at the timing locations or positions identified at 1220). The UE 115-c may monitor for particular portions of an SS block, such as the PSS and/or SSS, to decode a PBCH of the SS block. Such monitoring may be that the UE 115-c may receive the SS block, then attempt to decode all or portions of the SS block to determine if the UE 115-c is the recipient for the SS block. In some cases, UE 115-c may detect an SS block before determining the SS burst set pattern (e.g., UE 115-c may receive or detect an SS block at 1230 before determining an SS burst set pattern or determining the timing locations of SS blocks). For example, the indication at 1215, may, in some cases, be sent in RMSI (e.g., which may have a periodicity longer than that of the SS blocks. As such, from the perspective of UE 115-c, the indication of the SS burst set pattern may be received after receiving the SS block at 1230.

Figure 13:
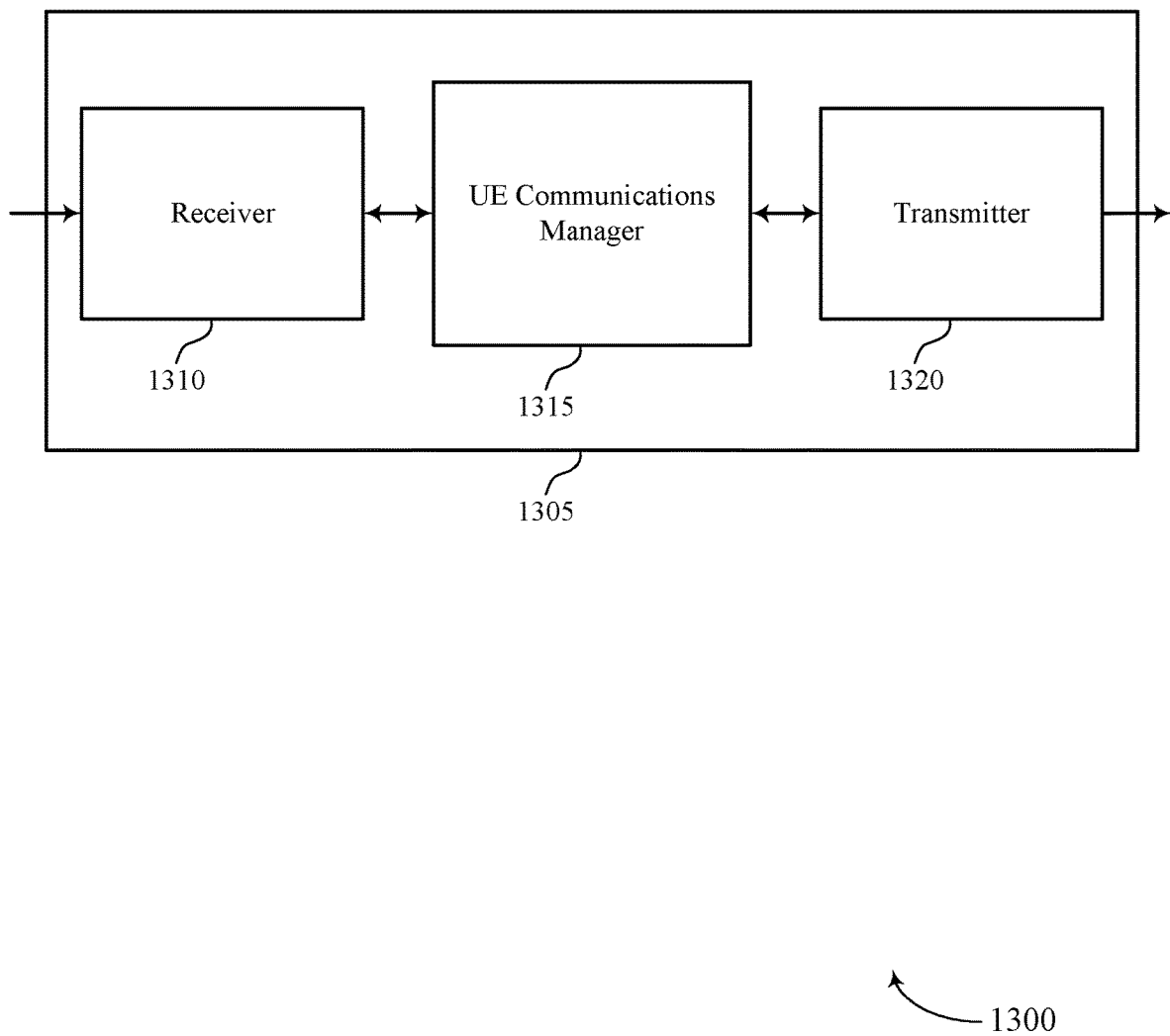
FIGS. 13 through 15 show block diagrams of a device that supports techniques for signaling SS burst set patterns in accordance with aspects of the present disclosure.

FIG. 13 shows a block diagram 1300 of a wireless device 1305 that supports techniques for signaling SS burst set patterns in accordance with aspects of the present disclosure. Wireless device 1305 may be an example of aspects of a UE 115 as described herein. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques for signaling SS burst set patterns, etc.). Information may be passed on to other components of the device. The receiver 1310 may be an example of aspects of the transceiver 1635 described with reference to FIG. 16. The receiver 1310 may utilize a single antenna or a set of antennas.

UE communications manager 1315 may be an example of aspects of the UE communications manager 1615 described with reference to FIG. 16.

UE communications manager 1315 and/or at least some of its various sub-components may be implemented in hardware, software executed by a processor, firmware, or any combination thereof. If implemented in software executed by a processor, the functions of the UE communications manager 1315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1315 and/or at least some of its various sub-components may be physically located at various positions, including being distributed such that portions of functions are implemented at different physical locations by one or more physical devices. In some examples, UE communications manager 1315 and/or at least some of its various sub-components may be a separate and distinct component in accordance with various aspects of the present disclosure. In other examples, UE communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1315 may receive an indication of a SS burst set pattern and determine a time location of one of more SSs based on the received indication.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
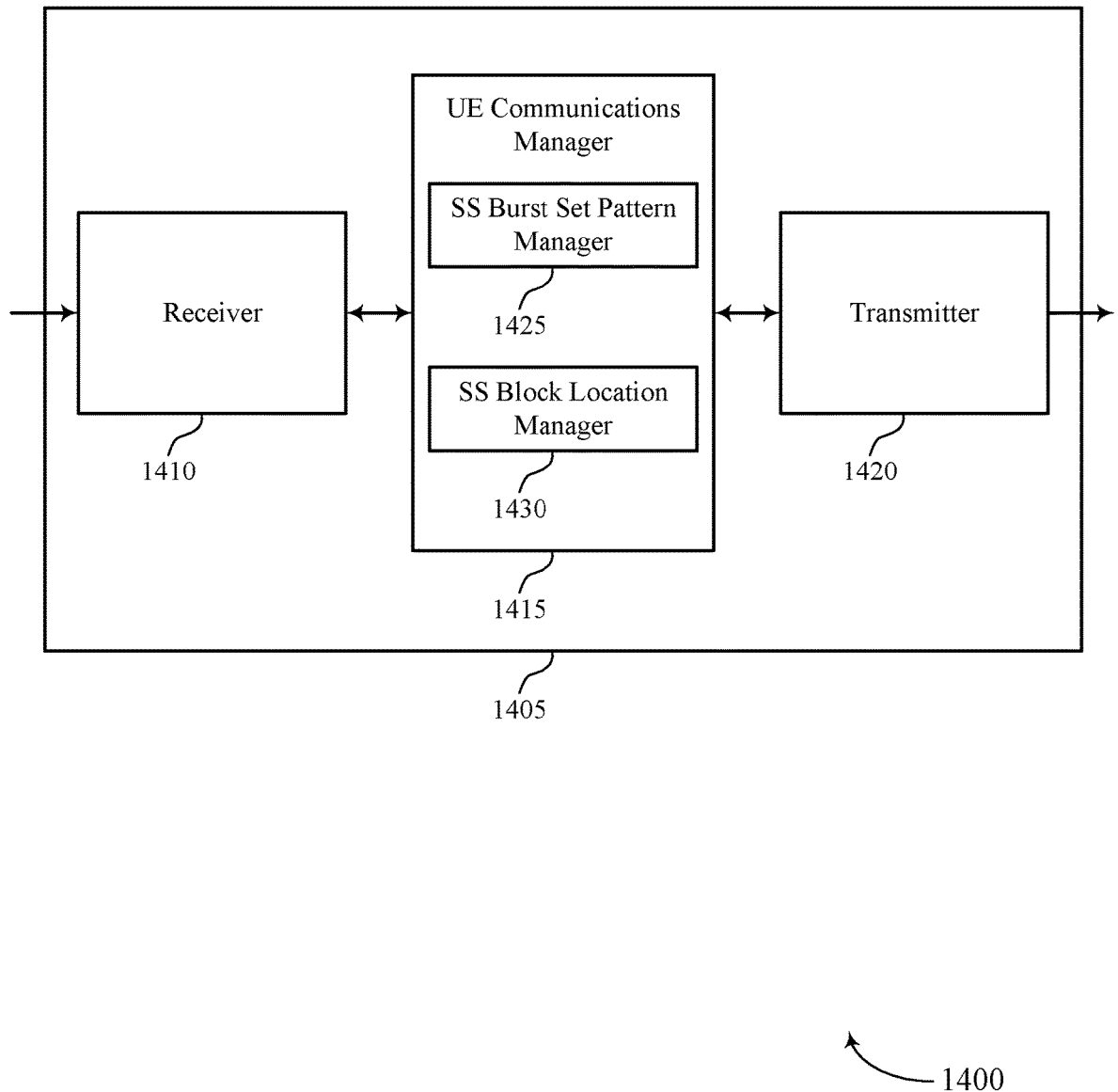

FIG. 14 shows a block diagram 1400 of a wireless device 1405 that supports techniques for signaling SS burst set patterns in accordance with aspects of the present disclosure.

Wireless device 1405 may be an example of aspects of a wireless device 1305 or a UE 115 as described with reference to FIG. 13. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to techniques for signaling SS burst set patterns, etc.). Information may be passed on to other components of the device. The receiver 1410 may be an example of aspects of the transceiver 1635 described with reference to FIG. 16. The receiver 1410 may utilize a single antenna or a set of antennas.

UE communications manager 1415 may be an example of aspects of the UE communications manager 1615 described with reference to FIG. 16. UE communications manager 1415 may also include SS burst set pattern manager 1425 and SS block location manager 1430.

SS burst set pattern manager 1425 may receive an indication of a SS burst set pattern, identify the SS burst set pattern based on the received indication of the SS burst set pattern and the first subcarrier spacing, and identify the SS burst set pattern based on the received indication of the SS burst set pattern and the second subcarrier spacing. SS burst set pattern manager 1425 may identify the SS burst set pattern based on received first indication and the received second indication, and identify an SS burst set pattern based on the received indication. In some cases, receiving the indication of the SS burst set pattern includes receiving a PSS, or an SSS, or a DMRS of a PBCH, or a PBCH payload, or an MIB, or an SIB, or an RRC transmission, and/or a handover message. The indication of the SS burst set pattern may indicate the SS burst set pattern. In some cases, receiving the indication of the SS burst set pattern includes receiving an indication of a time location of SS blocks within the SS burst set pattern. In some cases, the indication of the time location of the SS blocks includes a symbol, or a slot, or a radio frame location, or a combination thereof, of the SS blocks within the SS burst set pattern.

SS block location manager 1430 may determine a time location of one of more SSs based on the received indication, identify positions to monitor for one or more sets of SS blocks based on the received indication of the SS burst set pattern, monitor the identified positions for the one or more sets of SS blocks, and identify a first subcarrier spacing for SSs. In some cases, receiving the indication of the SS burst set pattern includes: receiving an indication of a slot occupancy pattern for a set of slots, the slot occupancy pattern indicating one or more slots of the set of slots that contain SS blocks of the one or more sets of SS blocks. In some cases, a set of SS blocks of the one or more sets of SS blocks includes a PSS symbol, an SSS symbol, one or more PBCH symbols, and one or more DMRS of one or more PBCH symbols. In some cases, an ordering of the set of SS symbols includes the PSS symbol, followed by a first of the one or more PBCH symbols, followed by the SSS symbol, followed by a second of the one or more PBCH symbols, followed by a third of the one or more PBCH symbols. In some cases, the one or more sets of SS blocks are monitored for in a first subcarrier spacing. SS block location manager 1430 may determine a time location of one or more combinations of a SIB, or a grant, or a payload of system information, or a combination thereof based on the identified SS burst set pattern, determine a time location of one or more RACH resources based on the identified SS burst set pattern, and determine a time location of a CSI-RS, or a measurement reference signal (MRS), or a combination thereof, based on the identified SS burst set pattern. In some cases, the one or more sets of SS blocks are monitored for in a first subcarrier spacing.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
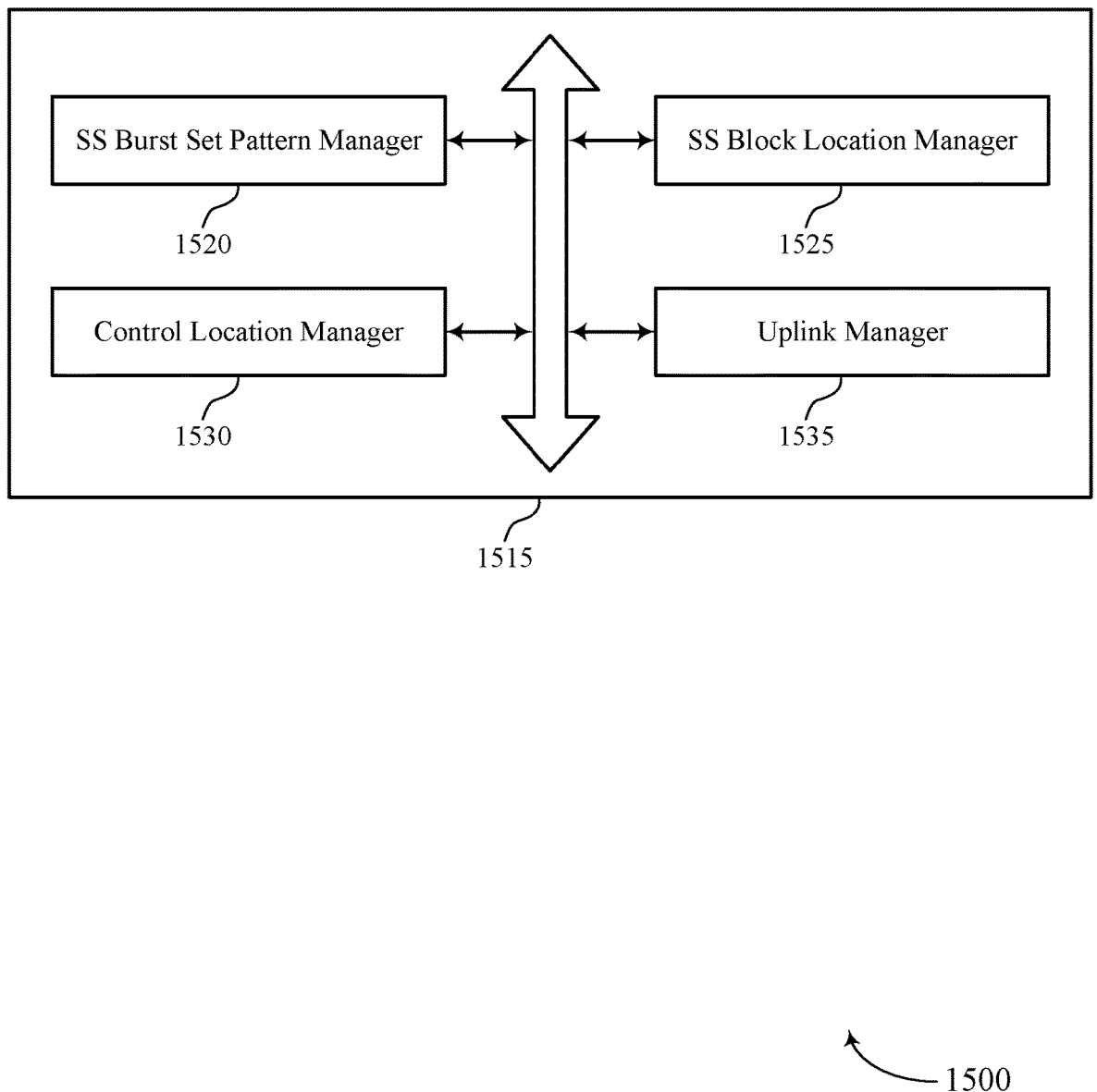

FIG. 15 shows a block diagram 1500 of a UE communications manager 1515 that supports techniques for signaling SS burst set patterns in accordance with aspects of the present disclosure. The UE communications manager 1515 may be an example of aspects of a UE communications manager 1315, a UE communications manager 1415, or a UE communications manager 1615 described with reference to FIGS. 13, 14, and 16. The UE communications manager 1515 may include SS burst set pattern manager 1520, SS block location manager 1525, control location manager 1530, and uplink manager 1535. Each of these modules may communicate, directly or indirectly, with one another (e.g., via one or more buses).

SS burst set pattern manager 1520 may receive an indication of a SS burst set pattern, identify the SS burst set pattern based on the received indication of the SS burst set pattern and the first subcarrier spacing, and identify the SS burst set pattern based on the received indication of the SS burst set pattern and the second subcarrier spacing. SS burst set pattern manager 1520 may identify the SS burst set pattern based on received first indication and the received second indication, and identify an SS burst set pattern based on the received indication. In some cases, receiving the indication of the SS burst set pattern includes: receiving a PSS, or an SSS, or a DMRS of a PBCH, or a PBCH payload, or an MIB, or an SIB, or an RRC transmission, or a handover message, or a combination thereof, that indicates the SS burst set pattern. In some cases, receiving the indication of the SS burst set pattern includes: receiving an indication of a time location of SS blocks within the SS burst set pattern. In some cases, the indication of the time location of the SS blocks includes a symbol, or a slot, or a radio frame location, or a combination thereof, of the SS blocks within the SS burst set pattern. In some cases, receiving the indication of the SS burst set pattern includes receiving a first indication of a first subcarrier spacing for SSs.

SS block location manager 1525 may determine a time location of one of more SSs based on the received indication, identify positions to monitor for one or more sets of SS blocks based on the received indication of the SS burst set pattern, monitor the identified positions for the one or more sets of SS blocks, and identify a first subcarrier spacing for SSs. In some cases, receiving the indication of the SS burst set pattern includes: receiving an indication of a slot occupancy pattern for a set of slots, the slot occupancy pattern indicating one or more slots of the set of slots that contain SS blocks of the one or more sets of SS blocks. In some cases, a set of SS blocks of the one or more sets of SS blocks includes a PSS symbol, an SSS symbol, one or more PBCH symbols, and one or more DMRS of one or more PBCH symbols. In some cases, an ordering of the set of SS symbols includes the PSS symbol, followed by a first of the one or more PBCH symbols, followed by the SSS symbol, followed by a second of the one or more PBCH symbols, followed by a third of the one or more PBCH symbols. In some cases, the one or more sets of SS blocks are monitored for in a first subcarrier spacing. SS block location manager may determine a time location of one or more combinations of a grant, or a payload of system information, or a combination thereof based on the identified SS burst set pattern, determine a time location of one or more RACH resources based on the identified SS burst set pattern, and determine a time location of a channel state information reference signal (CSI-RS), or a MRS, or a combination thereof, based on the identified SS burst set pattern. In some cases, the one or more sets of SS blocks are monitored for in a first subcarrier spacing.

Control location manager 1530 may identify positions to monitor for control information based on the received indication of the SS burst set pattern, monitor for control information in a slot prior to the positions monitored for the one or more sets of SS blocks, where the control information includes downlink control information, transmit uplink control information in one or two symbols of a slot after the positions in the slot monitored for the one or more sets of SS blocks, and identify a second subcarrier spacing for non-SSs. In some cases, the control information is monitored for in a second subcarrier spacing. In some cases, monitoring for the control information in the slot includes: monitoring for the downlink control information in one or two symbols of the slot prior to the positions monitored for the one or more sets of SS blocks.

Uplink manager 1535 may identify, based on the received indication of the SS burst set pattern, a guard period between two of the one or more sets of SS blocks.

Figure 16:
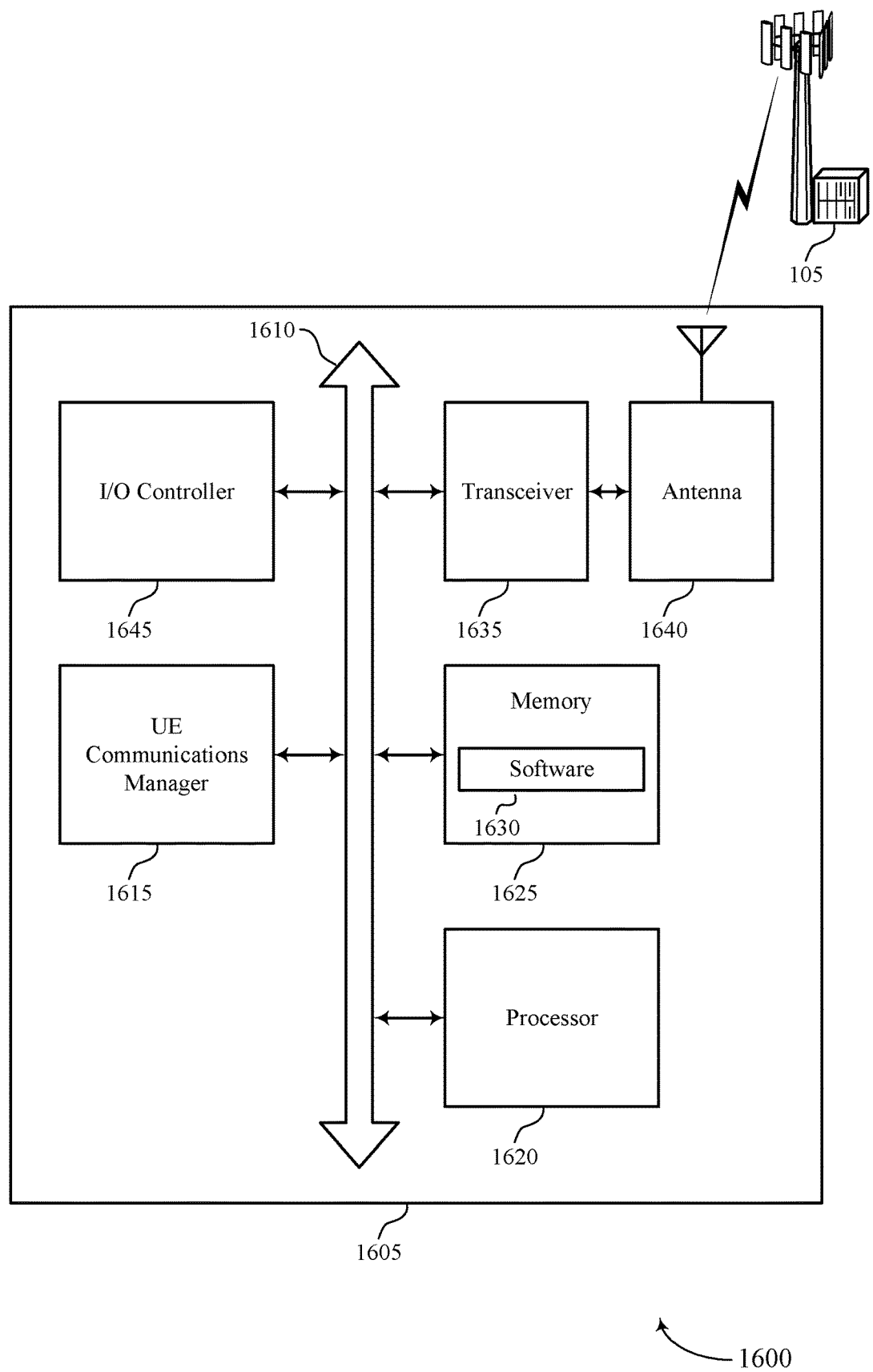
FIG. 16 illustrates a block diagram of a system including a user equipment (UE) that supports techniques for signaling SS burst set patterns in accordance with aspects of the present disclosure.

FIG. 16 shows a diagram of a system 1600 including a device 1605 that supports techniques for signaling SS burst set patterns in accordance with aspects of the present disclosure. Device 1605 may be an example of or include the components of wireless device 1305, wireless device 1405, or a UE 115 as described above, e.g., with reference to FIGS. 13 and 14. Device 1605 may include components for bi-directional voice and data communications including components for transmitting and receiving communications, including UE communications manager 1615, processor 1620, memory 1625, software 1630, transceiver 1635, antenna 1640, and I/O controller 1645. These components may be in electronic communication via one or more buses (e.g., bus 1610). Device 1605 may communicate wirelessly with one or more base stations 105.

Processor 1620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting techniques for signaling SS burst set patterns).

Memory 1625 may include random access memory (RAM) and read only memory (ROM). The memory 1625 may store computer-readable, computer-executable software 1630 including instructions that, when executed, cause the processor to perform various functions described herein. In some cases, the memory 1625 may contain, among other things, a basic input/output system (BIOS) which may control basic hardware or software operation such as the interaction with peripheral components or devices.

Software 1630 may include code to implement aspects of the present disclosure, including code to support techniques for signaling SS burst set patterns. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
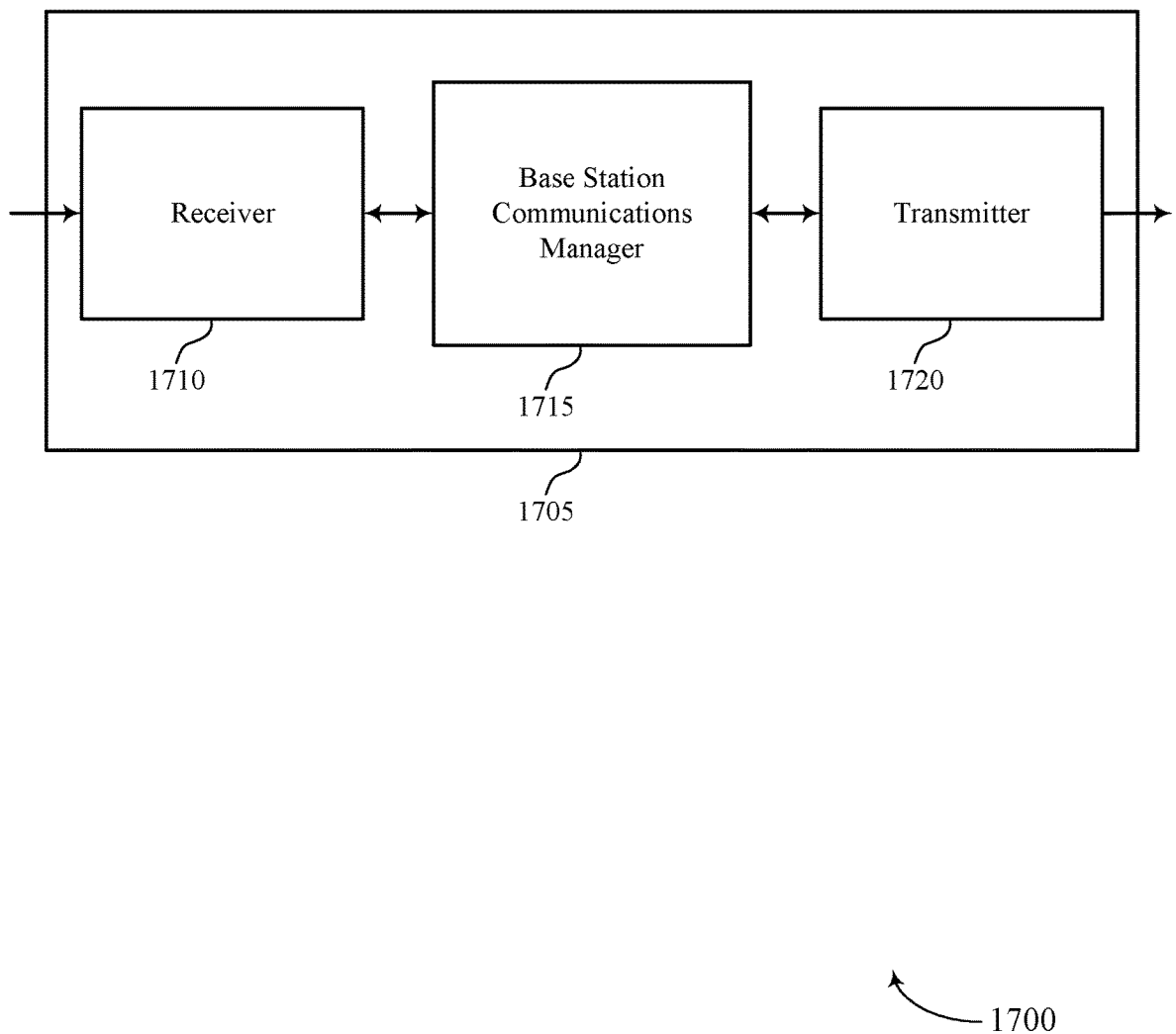
FIGS. 17 through 19 show block diagrams of a device that supports techniques for signaling SS burst set patterns in accordance with aspects of the present disclosure.

FIG. 17 shows a block diagram 1700 of a wireless device 1705 that supports techniques for signaling SS burst set patterns in accordance with aspects of the present disclosure. Wireless device 1705 may be an example of aspects of a base station 105 as described herein. Wireless device 1705 may include receiver 1710, base station communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to techniques for signaling SS burst set patterns, etc.). Information may be passed on to other components of the device. The receiver 1710 may be an example of aspects of the transceiver 2035 described with reference to FIG. 20. The receiver 1710 may utilize a single antenna or a set of antennas.

Base station communications manager 1715 may be an example of aspects of the base station communications manager 2015 described with reference to FIG. 20.

Base station communications manager 1715 and/or at least some of its various sub-components may be implemented in hardware, software executed by a processor, firmware, or any combination thereof. If implemented in software executed by a processor, the functions of the base station communications manager 1715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1715 and/or at least some of its various sub-components may be physically located at various positions, including being distributed such that portions of functions are implemented at different physical locations by one or more physical devices. In some examples, base station communications manager 1715 and/or at least some of its various sub-components may be a separate and distinct component in accordance with various aspects of the present disclosure. In other examples, base station communications manager 1715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1715 may identify a SS burst set pattern, the SS burst set pattern indicating positions for one or more sets of SS blocks, transmit an indication of the identified SS burst set pattern, and transmit the one or more sets of SS blocks based on the identified SS burst set pattern.

Transmitter 1720 may transmit signals generated by other components of the device. In some examples, the transmitter 1720 may be collocated with a receiver 1710 in a transceiver module. For example, the transmitter 1720 may be an example of aspects of the transceiver 2035 described with reference to FIG. 20. The transmitter 1720 may utilize a single antenna or a set of antennas.

Figure 18:
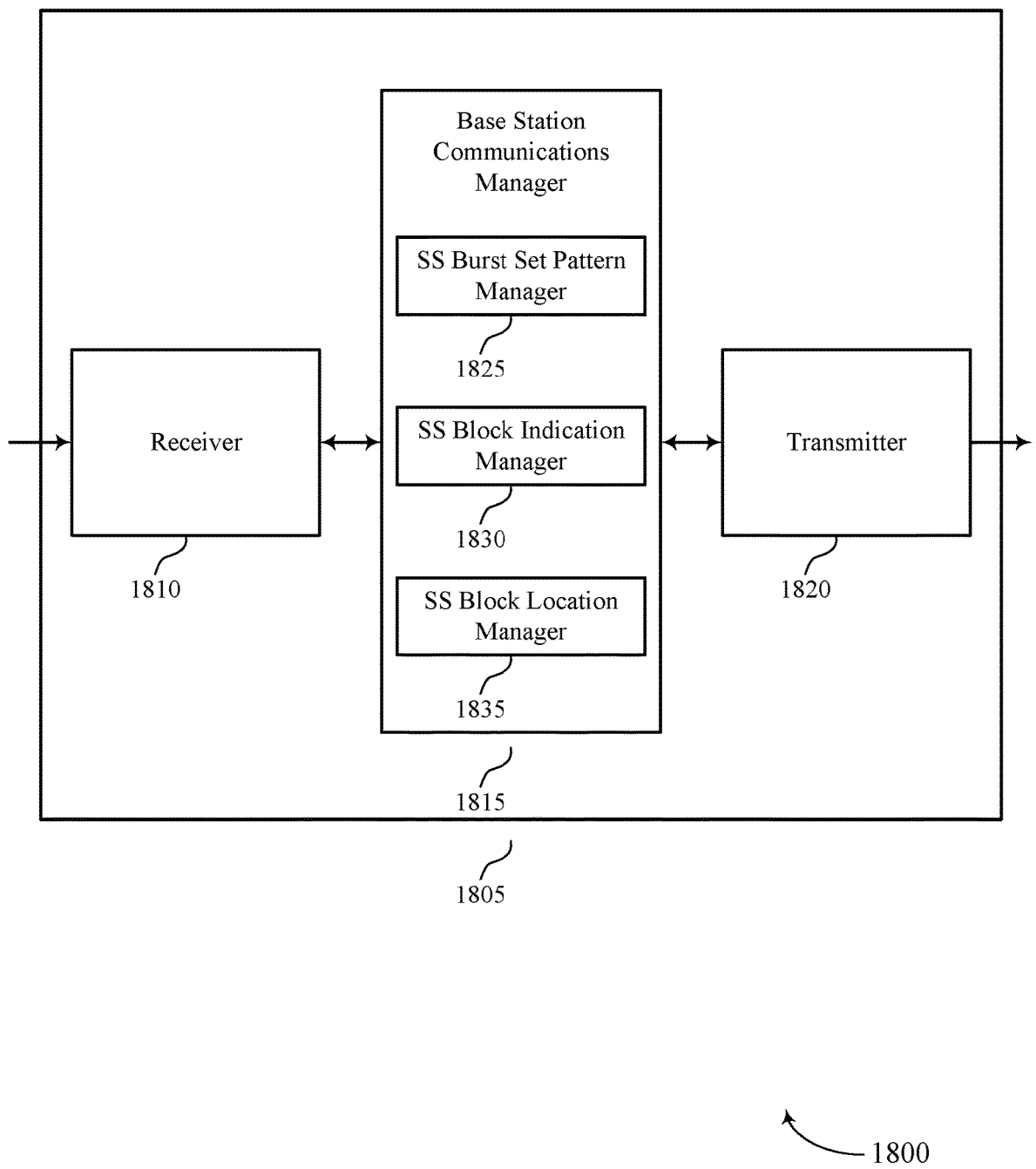

FIG. 18 shows a block diagram 1800 of a wireless device 1805 that supports techniques for signaling SS burst set patterns in accordance with aspects of the present disclosure. Wireless device 1805 may be an example of aspects of a wireless device 1705 or a base station 105 as described with reference to FIG. 17. Wireless device 1805 may include receiver 1810, base station communications manager 1815, and transmitter 1820. Wireless device 1805 may also include a processor. Each of these components may be in communication with one another (e.g., via one or more buses).

Receiver 1810 may receive information such as packets, user data, or control information associated with various information channels (e.g., control channels, data channels, and information related to techniques for signaling SS burst set patterns, etc.). Information may be passed on to other components of the device. The receiver 1810 may be an example of aspects of the transceiver 2035 described with reference to FIG. 20. The receiver 1810 may utilize a single antenna or a set of antennas.

Base station communications manager 1815 may be an example of aspects of the base station communications manager 2015 described with reference to FIG. 20. Base station communications manager 1815 may also include SS burst set pattern manager 1825, SS block indication manager 1830, and SS block location manager 1835.

SS burst set pattern manager 1825 may identify a SS burst set pattern, the SS burst set pattern indicating positions for one or more sets of SS blocks, identify the SS burst set pattern based on the first subcarrier spacing, and identify the SS burst set pattern based on the second subcarrier spacing. In some cases, identifying the SS burst set pattern further includes: identifying a time location of the one or more sets of SS blocks within the SS burst set pattern. In some cases, the time location of the one or more sets of SS blocks within the SS burst set pattern includes a symbol, or a slot, or a radio frame location, or a combination thereof, of the SS blocks within the SS burst set pattern. In some cases, a set of SS blocks of the one or more sets of SS blocks includes a PSS symbol, an SSS symbol, one or more PBCH symbols, and one or more DMRS of one or more PBCH symbols. In some cases, an ordering of the set of SS symbols includes the PSS symbol, followed by a first of the one or more PBCH symbols, followed by the SSS symbol, followed by a second of the one or more PBCH symbols, followed by a third of the one or more PBCH symbols.

SS block indication manager 1830 may transmit an indication of the identified SS burst set pattern. In some cases, transmitting the indication of the identified SS burst set pattern includes: transmitting a PSS, or an SSS, or a DMRS of a PBCH, or a PBCH payload, or an MIB, or an SIB, or an RRC transmission, or a handover message, or a combination thereof, that indicates the identified SS burst set pattern. In some cases, transmitting the indication of the identified SS burst set pattern includes transmitting an indication of a slot occupancy pattern for a set of slots, the slot occupancy pattern indicating one or more slots of the set of slots that contain SS blocks of the one or more sets of SS blocks.

SS block location manager 1835 may transmit the one or more sets of SS blocks based on the identified SS burst set pattern and identify a first subcarrier spacing for SSs. In some cases, identifying the first subcarrier spacing includes: identifying the first subcarrier spacing based on a system operating bandwidth. In some cases, transmitting the indication of the identified SS burst set pattern includes transmitting a first indication of a first subcarrier spacing for SSs.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2035 described with reference to FIG. 20. The transmitter 1820 may utilize a single antenna or a set of antennas.

Figure 19:
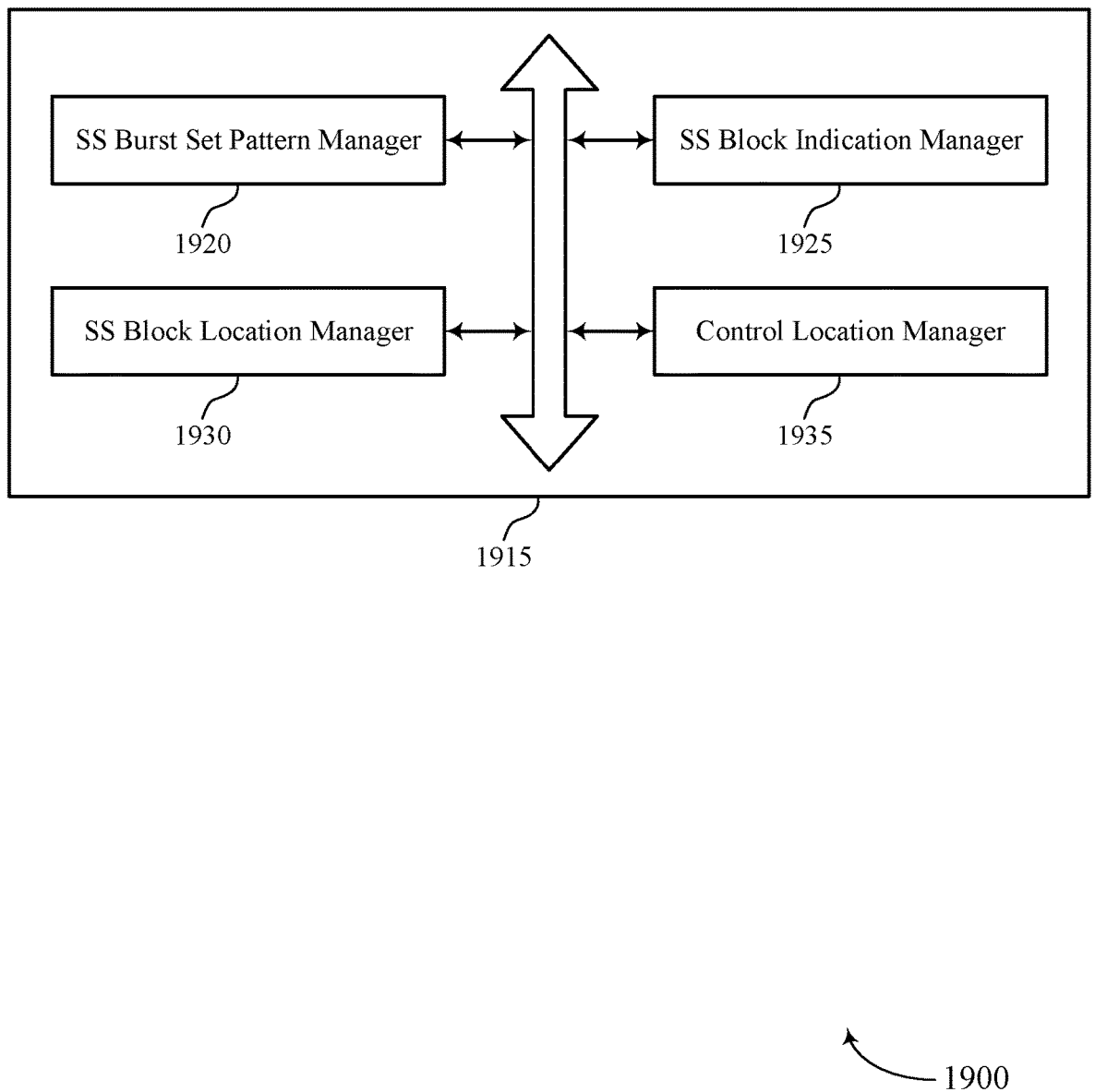

FIG. 19 shows a block diagram 1900 of a base station communications manager 1915 that supports techniques for signaling SS burst set patterns in accordance with aspects of the present disclosure. The base station communications manager 1915 may be an example of aspects of a base station communications manager 2015 described with reference to FIGS. 17, 18, and 20. The base station communications manager 1915 may include SS burst set pattern manager 1920, SS block indication manager 1925, SS block location manager 1930, and control location manager 1935. Each of these modules may communicate, directly or indirectly, with one another (e.g., via one or more buses).

SS burst set pattern manager 1920 may identify a SS burst set pattern, the SS burst set pattern indicating positions for one or more sets of SS blocks, identify the SS burst set pattern based on the first subcarrier spacing, and identify the SS burst set pattern based on the second subcarrier spacing. In some cases, identifying the SS burst set pattern further includes: identifying a time location of the one or more sets of SS blocks within the SS burst set pattern. In some cases, the time location of the one or more sets of SS blocks within the SS burst set pattern includes a symbol, or a slot, or a radio frame location, or a combination thereof, of the SS blocks within the SS burst set pattern. In some cases, a set of SS blocks of the one or more sets of SS blocks includes a PSS symbol, an SSS symbol, one or more PBCH symbols, and one or more DMRS of one or more PBCH symbols. In some cases, an ordering of the set of SS symbols includes the PSS symbol, followed by a first of the one or more PBCH symbols, followed by the SSS symbol, followed by a second of the one or more PBCH symbols, followed by a third of the one or more PBCH symbols.

SS block indication manager 1925 may transmit an indication of the identified SS burst set pattern. In some cases, transmitting the indication of the identified SS burst set pattern includes: transmitting a PSS, or an SSS, or a DMRS of a PBCH, or a PBCH payload, or an MIB, or an SIB, or an RRC transmission, or a handover message, or a combination thereof, that indicates the identified SS burst set pattern. In some cases, transmitting the indication of the identified SS burst set pattern includes: transmitting an indication of a slot occupancy pattern for a set of slots, the slot occupancy pattern indicating one or more slots of the set of slots that contain SS blocks of the one or more sets of SS blocks. In some cases, transmitting the indication of the identified SS burst set pattern includes: transmitting a PSS, or an SSS, or a DMRS of a PBCH, or a PBCH payload, or an MIB, or an SIB, or an RRC transmission, or a handover message, or a combination thereof, that indicates the identified SS burst set pattern.

SS block location manager 1930 may transmit the one or more sets of SS blocks based on the identified SS burst set pattern and identify a first subcarrier spacing for SSs. In some cases, identifying the first subcarrier spacing includes: identifying the first subcarrier spacing based on a system operating bandwidth. In some cases, transmitting the indication of the identified SS burst set pattern includes transmitting a first indication of a first subcarrier spacing for SSs.

Control location manager 1935 may identify a second subcarrier spacing for non-SSs, transmit, based on the identified SS burst set pattern, control information in a slot using a first subcarrier spacing, where the one or more sets of SS blocks are transmitted in the slot using a second subcarrier spacing, transmit downlink control information in a slot prior to transmitting the one or more sets of SS blocks in the slot based on the identified SS burst set pattern, and monitor for uplink control information in one or two symbols of a slot after transmitting the one or more sets of SS blocks in the slot. In some cases, identifying the second subcarrier spacing includes: identifying the second subcarrier spacing based on a system operating bandwidth. In some cases, the control information includes downlink control information. In some cases, transmitting the downlink control information in the slot includes: transmitting the downlink control information in one or two symbols of the slot prior to transmitting the one or more sets of SS blocks in the slot.

Figure 20:
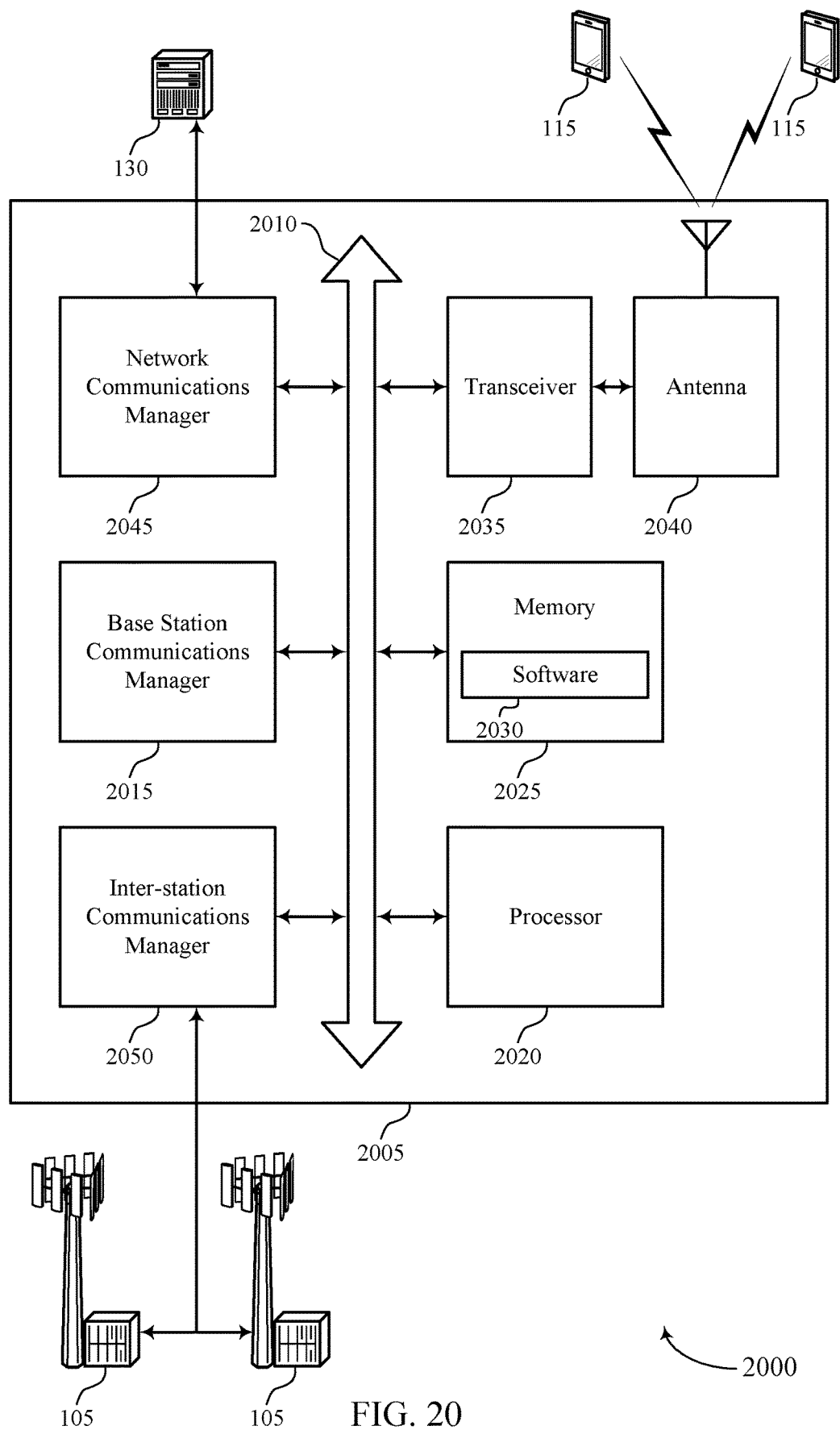
FIG. 20 illustrates a block diagram of a system including a base station that supports techniques for signaling SS burst set patterns in accordance with aspects of the present disclosure.

FIG. 20 shows a diagram of a system 2000 including a device 2005 that supports techniques for signaling SS burst set patterns in accordance with aspects of the present disclosure. Device 2005 may be an example of or include the components of base station 105 as described above, e.g., with reference to FIG. 1. Device 2005 may include components for bi-directional voice and data communications including components for transmitting and receiving communications, including base station communications manager 2015, processor 2020, memory 2025, software 2030, transceiver 2035, antenna 2040, network communications manager 2045, and inter-station communications manager 2050. These components may be in electronic communication via one or more buses (e.g., bus 2010). Device 2005 may communicate wirelessly with one or more UEs 115.

Processor 2020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2020 may be configured to operate a memory array using a memory controller. In other cases, a memory controller may be integrated into processor 2020. Processor 2020 may be configured to execute computer-readable instructions stored in a memory to perform various functions (e.g., functions or tasks supporting techniques for signaling SS burst set patterns).

Memory 2025 may include RAM and ROM. The memory 2025 may store computer-readable, computer-executable software 2030 including instructions that, when executed, cause the processor to perform various functions described herein. In some cases, the memory 2025 may contain, among other things, a BIOS which may control basic hardware or software operation such as the interaction with peripheral components or devices.

Software 2030 may include code to implement aspects of the present disclosure, including code to support techniques for signaling SS burst set patterns. Software 2030 may be stored in a non-transitory computer-readable medium such as system memory or other memory. In some cases, the software 2030 may not be directly executable by the processor but may cause a computer (e.g., when compiled and executed) to perform functions described herein.

Transceiver 2035 may communicate bi-directionally, via one or more antennas, wired, or wireless links as described above. For example, the transceiver 2035 may represent a wireless transceiver and may communicate bi-directionally with another wireless transceiver. The transceiver 2035 may also include a modem to modulate the packets and provide the modulated packets to the antennas for transmission, and to demodulate packets received from the antennas.

In some cases, the wireless device may include a single antenna 2040. However, in some cases the device may have more than one antenna 2040, which may be capable of concurrently transmitting or receiving multiple wireless transmissions.

Network communications manager 2045 may manage communications with the core network (e.g., via one or more wired backhaul links). For example, the network communications manager 2045 may manage the transfer of data communications for client devices, such as one or more UEs 115.

Inter-station communications manager 2050 may manage communications with other base station 105 and may include a controller or scheduler for controlling communications with UEs 115 in cooperation with other base stations 105. For example, the inter-station communications manager 2050 may coordinate scheduling for transmissions to UEs 115 for various interference mitigation techniques such as beamforming or joint transmission. In some examples, inter-station communications manager 2050 may provide an X2 interface within a Long Term Evolution (LTE)/LTE-A wireless communication network technology to provide communication between base stations 105.

Figure 21:
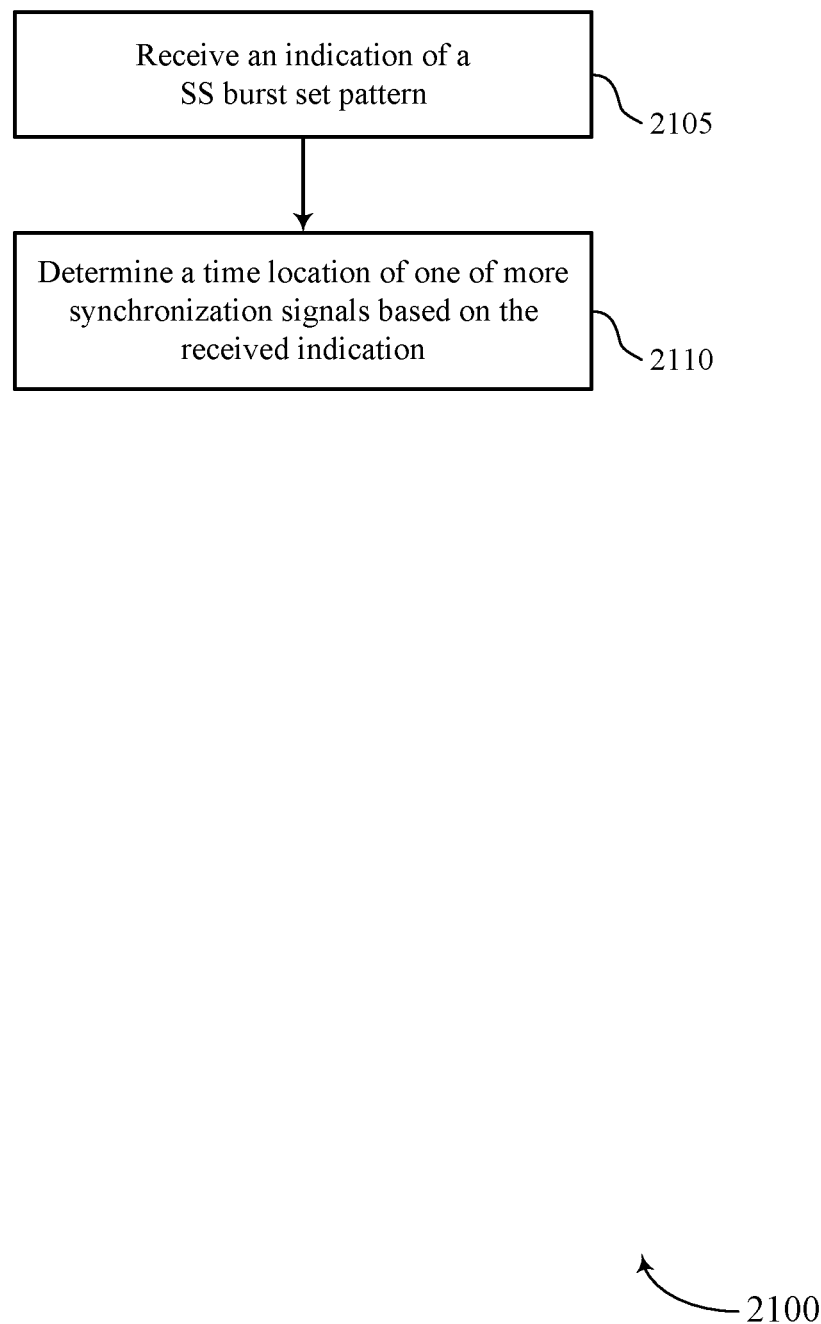
FIGS. 21 through 25 illustrate methods for techniques for signaling SS burst set patterns in accordance with aspects of the present disclosure.

FIG. 21 shows a flowchart illustrating a method 2100 for techniques for signaling SS burst set patterns in accordance with aspects of the present disclosure. The operations of method 2100 may be implemented by a UE 115 or its components as described herein. For example, the operations of method 2100 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive an indication of a SS burst set pattern. The operations of block 2105 may be performed according to the methods described herein. In certain examples, aspects of the operations of block 2105 may be performed by a SS burst set pattern manager as described with reference to FIGS. 13 through 16.

At block 2110 the UE 115 may determine a time location of one of more SSs based at least in part on the received indication. The operations of block 2110 may be performed according to the methods described herein. In certain examples, aspects of the operations of block 2110 may be performed by a SS block location manager as described with reference to FIGS. 13 through 16.

Figure 22:
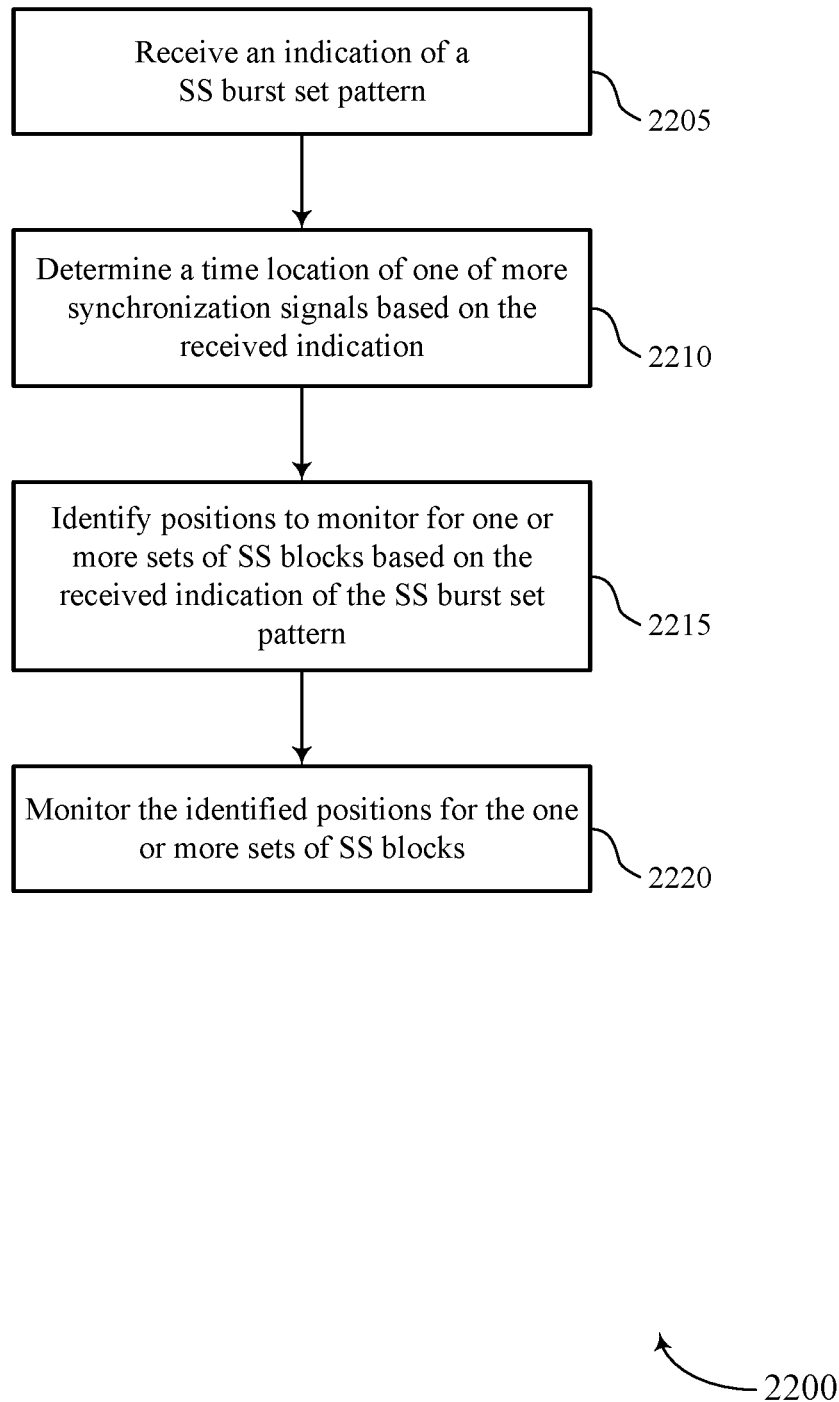

FIG. 22 shows a flowchart illustrating a method 2200 for techniques for signaling SS burst set patterns in accordance with aspects of the present disclosure. The operations of method 2200 may be implemented by a UE 115 or its components as described herein. For example, the operations of method 2200 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may receive an indication of a SS burst set pattern. The operations of block 2205 may be performed according to the methods described herein. In certain examples, aspects of the operations of block 2205 may be performed by a SS burst set pattern manager as described with reference to FIGS. 13 through 16.

At block 2210 the UE 115 may determine a time location of one of more SSs based at least in part on the received indication. The operations of block 2210 may be performed according to the methods described herein. In certain examples, aspects of the operations of block 2210 may be performed by a SS block location manager as described with reference to FIGS. 13 through 16.

At block 2215 the UE 115 may identify positions to monitor for one or more sets of SS blocks based at least in part on the received indication of the SS burst set pattern. The operations of block 2215 may be performed according to the methods described herein. In certain examples, aspects of the operations of block 2215 may be performed by a SS block location manager as described with reference to FIGS. 13 through 16.

At block 2220 the UE 115 may monitor the identified positions for the one or more sets of SS blocks. The operations of block 2220 may be performed according to the methods described herein. In certain examples, aspects of the operations of block 2220 may be performed by a SS block location manager as described with reference to FIGS. 13 through 16.

Figure 23:
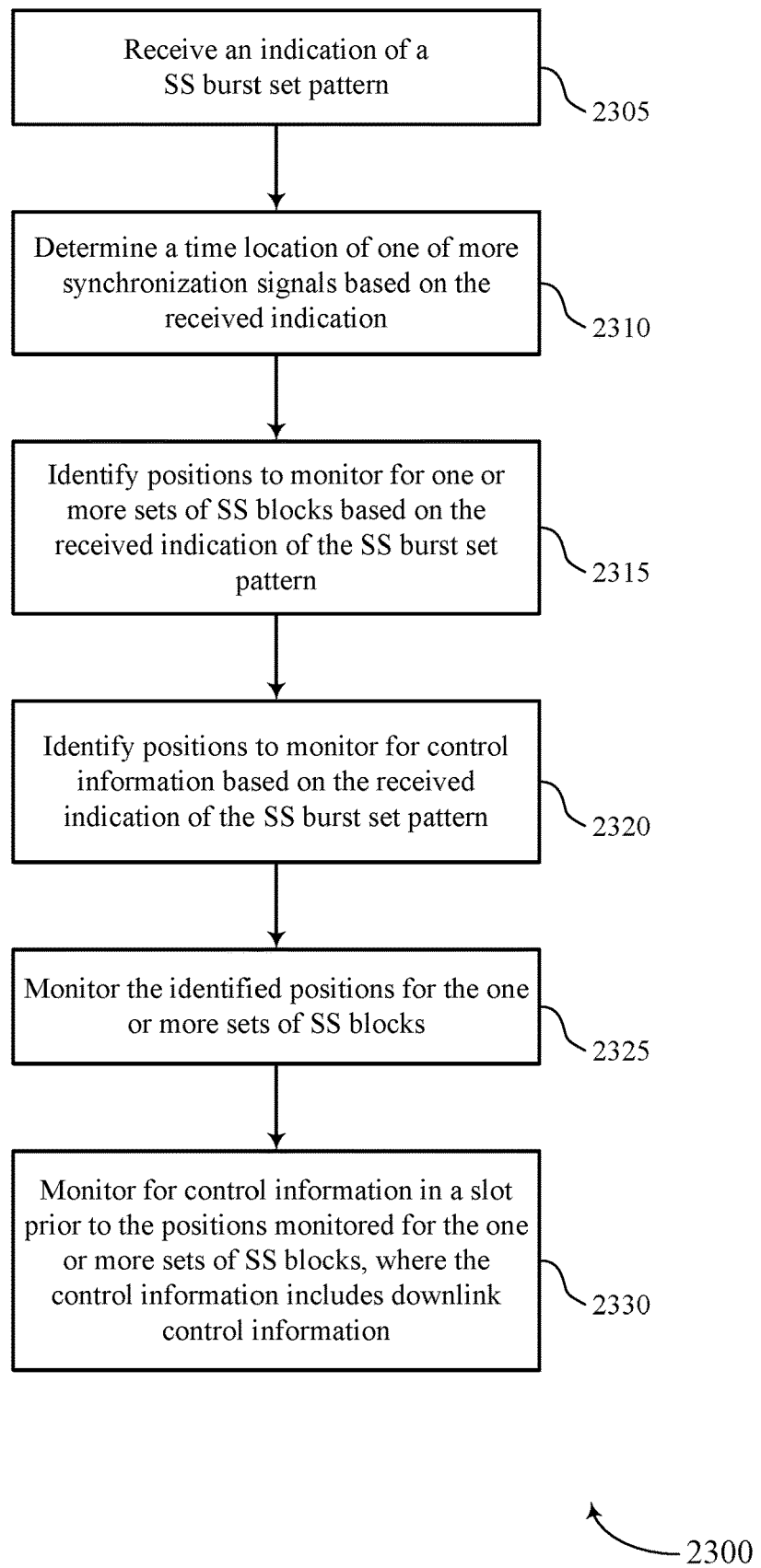

FIG. 23 shows a flowchart illustrating a method 2300 for techniques for signaling SS burst set patterns in accordance with aspects of the present disclosure. The operations of method 2300 may be implemented by a UE 115 or its components as described herein. For example, the operations of method 2300 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2305 the UE 115 may receive an indication of a SS burst set pattern. The operations of block 2305 may be performed according to the methods described herein. In certain examples, aspects of the operations of block 2305 may be performed by a SS burst set pattern manager as described with reference to FIGS. 13 through 16.

At block 2310 the UE 115 may determine a time location of one of more SSs based at least in part on the received indication. The operations of block 2310 may be performed according to the methods described herein. In certain examples, aspects of the operations of block 2310 may be performed by a SS block location manager as described with reference to FIGS. 13 through 16.

At block 2315 the UE 115 may identify positions to monitor for one or more sets of SS blocks based at least in part on the received indication of the SS burst set pattern. The operations of block 2315 may be performed according to the methods described herein. In certain examples, aspects of the operations of block 2315 may be performed by a SS block location manager as described with reference to FIGS. 13 through 16.

At block 2320 the UE 115 may identify positions to monitor for control information based at least in part on the received indication of the SS burst set pattern. The operations of block 2320 may be performed according to the methods described herein. In certain examples, aspects of the operations of block 2320 may be performed by a control location manager as described with reference to FIGS. 13 through 16.

At block 2325 the UE 115 may monitor the identified positions for the one or more sets of SS blocks. The operations of block 2325 may be performed according to the methods described herein. In certain examples, aspects of the operations of block 2325 may be performed by a SS block location manager as described with reference to FIGS. 13 through 16.

At block 2330 the UE 115 may monitor for control information in a slot prior to the positions monitored for the one or more sets of SS blocks, wherein the control information comprises downlink control information. The operations of block 2330 may be performed according to the methods described herein. In certain examples, aspects of the operations of block 2330 may be performed by a control location manager as described with reference to FIGS. 13 through 16.

Figure 24:
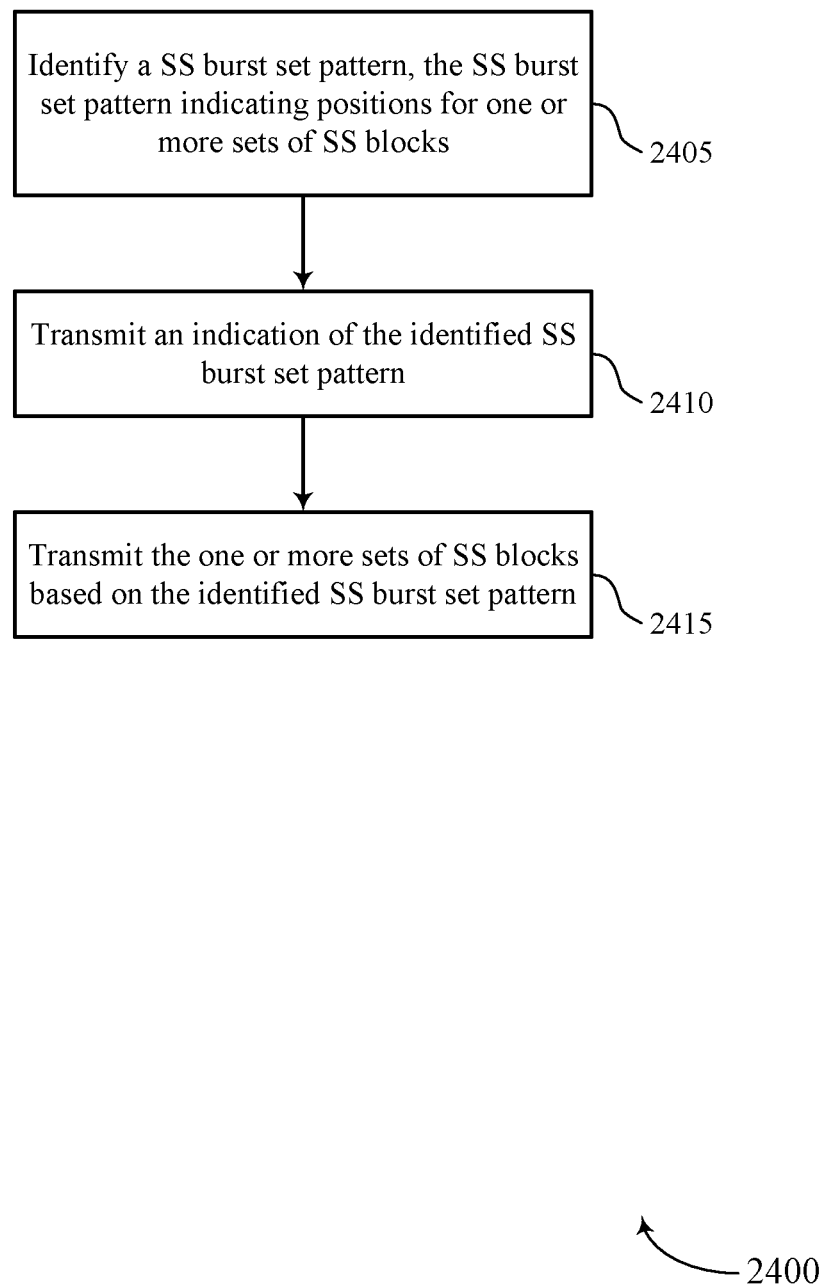

FIG. 24 shows a flowchart illustrating a method 2400 for techniques for signaling SS burst set patterns in accordance with aspects of the present disclosure. The operations of method 2400 may be implemented by a base station 105 or its components as described herein. For example, the operations of method 2400 may be performed by a base station communications manager as described with reference to FIGS. 17 through 20. In some examples, a base station 105 may execute a set of codes to control the functional elements of the device to perform the functions described below. Additionally or alternatively, the base station 105 may perform aspects of the functions described below using special-purpose hardware.

At block 2405 the base station 105 may identify a SS burst set pattern, the SS burst set pattern indicating positions for one or more sets of SS blocks. The operations of block 2405 may be performed according to the methods described herein. In certain examples, aspects of the operations of block 2405 may be performed by a SS burst set pattern manager as described with reference to FIGS. 17 through 20.

At block 2410 the base station 105 may transmit an indication of the identified SS burst set pattern. The operations of block 2410 may be performed according to the methods described herein. In certain examples, aspects of the operations of block 2410 may be performed by a SS block indication manager as described with reference to FIGS. 17 through 20.

At block 2415 the base station 105 may transmit the one or more sets of SS blocks based at least in part on the identified SS burst set pattern. The operations of block 2415 may be performed according to the methods described herein. In certain examples, aspects of the operations of block 2415 may be performed by a SS block location manager as described with reference to FIGS. 17 through 20.

Figure 25:
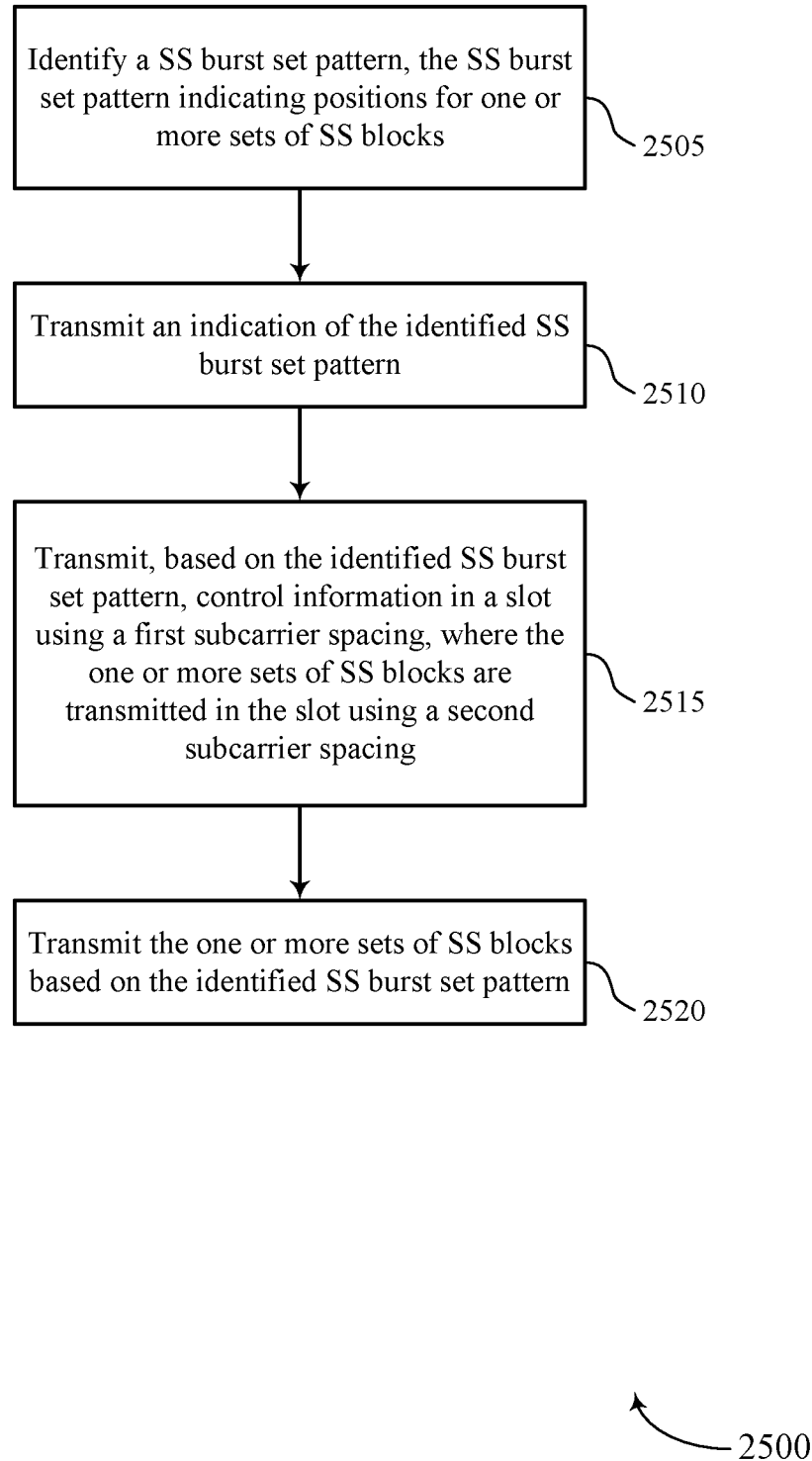

FIG. 25 shows a flowchart illustrating a method 2500 for techniques for signaling SS burst set patterns in accordance with aspects of the present disclosure. The operations of method 2500 may be implemented by a base station 105 or its components as described herein. For example, the operations of method 2500 may be performed by a base station communications manager as described with reference to FIGS. 17 through 20. In some examples, a base station 105 may execute a set of codes to control the functional elements of the device to perform the functions described below. Additionally or alternatively, the base station 105 may perform aspects of the functions described below using special-purpose hardware.

At block 2505 the base station 105 may identify a SS burst set pattern, the SS burst set pattern indicating positions for one or more sets of SS blocks. The operations of block 2505 may be performed according to the methods described herein. In certain examples, aspects of the operations of block 2505 may be performed by a SS burst set pattern manager as described with reference to FIGS. 17 through 20.

At block 2510 the base station 105 may transmit an indication of the identified SS burst set pattern. The operations of block 2510 may be performed according to the methods described herein. In certain examples, aspects of the operations of block 2510 may be performed by a SS block indication manager as described with reference to FIGS. 17 through 20.

At block 2515 the base station 105 may transmit, based at least in part on the identified SS burst set pattern, control information in a slot using a first subcarrier spacing, wherein the one or more sets of SS blocks are transmitted in the slot using a second subcarrier spacing. The operations of block 2515 may be performed according to the methods described herein. In certain examples, aspects of the operations of block 2515 may be performed by a control location manager as described with reference to FIGS. 17 through 20.

At block 2520 the base station 105 may transmit the one or more sets of SS blocks based at least in part on the identified SS burst set pattern. The operations of block 2520 may be performed according to the methods described herein. In certain examples, aspects of the operations of block 2520 may be performed by a SS block location manager as described with reference to FIGS. 17 through 20.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a transmission including an indication of a synchronization signal (SS) burst set pattern, the indication provided via a primary synchronization signal (PSS), or a secondary synchronization signal (SSS), or a handover message, or a combination thereof, that indicates the SS burst set pattern; and
   determining at least one time location of one or more SSs based at least in part on the received indication.

2. The method of claim 1, further comprising:
   identifying at least one time location to monitor for one or more sets of SS blocks based at least in part on the received indication of the SS burst set pattern; and
   monitoring the identified at least one time location for the one or more sets of SS blocks.

3. The method of claim 2, wherein receiving the transmission including the indication of the SS burst set pattern comprises:
   receiving an indication of a slot occupancy pattern for a set of slots, the slot occupancy pattern indicating one or more slots of the set of slots that contain SS blocks of the one or more sets of SS blocks.

4. The method of claim 2, wherein a set of SS blocks of the one or more sets of SS blocks comprises a primary synchronization signal (PSS) symbol, a secondary synchronization signal (SSS) symbol, one or more physical broadcast channel (PBCH) symbols, and one or more demodulation reference signals (DMRS) of one or more PBCH symbols.

5. The method of claim 4, wherein an ordering of the set of SS symbols comprises the PSS symbol, followed by a first of the one or more PBCH symbols, followed by the SSS symbol, followed by a second of the one or more PBCH symbols, followed by a third of the one or more PBCH symbols.

6. The method of claim 1, further comprising:
identifying at least one time location to monitor for control information based at least in part on the received indication of the SS burst set pattern.

7. The method of claim 6, further comprising:
monitoring for one or more sets of SS blocks in a first subcarrier spacing; and
monitoring for the control information in a second subcarrier spacing.

8. The method of claim 6, further comprising:
monitoring the at least one time location for one or more sets of SS blocks based at least in part on the received indication of the SS burst set pattern; and
monitoring for control information in a slot prior to the at least one time location monitored for the one or more sets of SS blocks, wherein the control information comprises downlink control information.

9. The method of claim 8, wherein monitoring for the control information in the slot comprises:
monitoring for the downlink control information in one or two symbols of the slot prior to the at least one time location monitored for the one or more sets of SS blocks.

10. The method of claim 6, further comprising:
monitoring the at least one time location for one or more sets of SS blocks based at least in part on the received indication of the SS burst set pattern; and
transmitting uplink control information in one or two symbols of a slot after the at least one time location in the slot monitored for the one or more sets of SS blocks.

11. The method of claim 1, further comprising:
identifying, based at least in part on the received indication of the SS burst set pattern, a guard period between two of the one or more sets of SS blocks.

12. The method of claim 1, wherein receiving the transmission including the indication of the SS burst set pattern comprises:
receiving an indication of at least one time location of one or more SS blocks within the SS burst set pattern.

13. The method of claim 12, wherein the indication of the at least one time location of the SS blocks comprises a symbol, or a slot, or a radio frame location, or a combination thereof, of the SS blocks within the SS burst set pattern.

14. The method of claim 1, further comprising:
identifying a first subcarrier spacing for SSs; and
identifying the SS burst set pattern based at least in part on the received indication of the SS burst set pattern and the first subcarrier spacing.

15. The method of claim 1, further comprising:
identifying a second subcarrier spacing for non-SSs; and
identifying the SS burst set pattern based at least in part on the received indication of the SS burst set pattern and the second subcarrier spacing.

16. The method of claim 1, wherein receiving the transmission including the indication of the SS burst set pattern comprises:

receiving a first indication of a first subcarrier spacing for SSs;
receiving a second indication of a second subcarrier spacing for non-SSs; and
identifying the SS burst set pattern based at least in part on the received first indication and the received second indication.

17. The method of claim 1, further comprising:
identifying an SS burst set pattern based at least in part on the received indication; and
determining a time location of one or more combinations of a grant, or a payload of system information, or a combination thereof, based at least in part on the identified SS burst set pattern.

18. The method of claim 1, further comprising:
identifying an SS burst set pattern based at least in part on the received indication; and
determining a time location of one or more random access channel (RACH) resources based at least in part on the identified SS burst set pattern.

19. The method of claim 1, further comprising:
identifying an SS burst set pattern based at least in part on the received indication; and
determining a time location of a channel state information reference signal (CSI-RS), or a measurement reference signal (MRS), or a combination thereof, based at least in part on the identified SS burst set pattern.

20. A method for wireless communication at a base station, comprising:
identifying a synchronization signal (SS) burst set pattern, the SS burst set pattern indicating at least one time location for one or more sets of SS blocks;
transmitting a transmission including an indication of the identified SS burst set pattern, the indication provided via a primary synchronization signal (PSS), or a secondary synchronization signal (SSS), or a handover message, or a combination thereof, that indicates the identified SS burst set pattern; and
transmitting the one or more sets of SS blocks based at least in part on the identified SS burst set pattern.

21. The method of claim 20, wherein identifying the SS burst set pattern further comprises:
identifying the at least one time location of the one or more sets of SS blocks within the SS burst set pattern.

22. The method of claim 21, wherein the at least one time location of the one or more sets of SS blocks within the SS burst set pattern comprises a symbol, or a slot, or a radio frame location, or a combination thereof, of the SS blocks within the SS burst set pattern.

23. The method of claim 20, wherein transmitting the transmission including the indication of the identified SS burst set pattern comprises:
transmitting an indication of a slot occupancy pattern for a set of slots, the slot occupancy pattern indicating one or more slots of the set of slots that contain SS blocks of the one or more sets of SS blocks.

24. The method of claim 20, further comprising:
identifying a first subcarrier spacing for SSs; and
identifying the SS burst set pattern based at least in part on the first subcarrier spacing.

25. The method of claim 24, wherein identifying the first subcarrier spacing comprises:
identifying the first subcarrier spacing based at least in part on a system operating bandwidth.

26. The method of claim 20, further comprising:
identifying a second subcarrier spacing for non-SSs; and identifying the SS burst set pattern based at least in part on the second subcarrier spacing.

27. The method of claim 26, wherein identifying the second subcarrier spacing comprises:
identifying the second subcarrier spacing based at least in part on a system operating bandwidth.

28. The method of claim 26, wherein transmitting the transmission including the indication of the identified SS burst set pattern comprises:
transmitting a first indication of a first subcarrier spacing for SSs; and
transmitting a second indication of a second subcarrier spacing for non-SSs.

29. The method of claim 20, wherein a set of SS blocks of the one or more sets of SS blocks comprises a primary synchronization signal (PSS) symbol, a secondary synchronization signal (SSS) symbol, one or more physical broadcast channel (PBCH) symbols, and one or more demodulation reference signals (DMRS) of one or more PBCH symbols.

30. The method of claim 29, wherein an ordering of the set of SS symbols comprises the PSS symbol, followed by a first of the one or more PBCH symbols, followed by the SSS symbol, followed by a second of the one or more PBCH symbols, followed by a third of the one or more PBCH symbols.

31. The method of claim 20, further comprising:
transmitting, based at least in part on the identified SS burst set pattern, control information in a slot using a first subcarrier spacing, wherein the one or more sets of SS blocks are transmitted in the slot using a second subcarrier spacing.

32. The method of claim 31, wherein the control information comprises downlink control information.

33. The method of claim 20, further comprising:
transmitting downlink control information in a slot prior to transmitting the one or more sets of SS blocks in the slot based at least in part on the identified SS burst set pattern.

34. The method of claim 33, wherein transmitting the downlink control information in the slot comprises:
transmitting the downlink control information in one or two symbols of the slot prior to transmitting the one or more sets of SS blocks in the slot.

35. The method of claim 20, further comprising:
monitoring for uplink control information in one or two symbols of a slot after transmitting the one or more sets of SS blocks in the slot.

36. An apparatus for wireless communication, comprising:
a processor;
memory in electronic communication with the processor; and
instructions stored in the memory and operable, when executed by the processor, to cause the apparatus to:
receive a transmission including an indication of a synchronization signal (SS) burst set pattern, the indication provided via a primary synchronization signal (PSS), or a secondary synchronization signal (SSS), or a handover message, or a combination thereof, that indicates the SS burst set pattern; and
determine at least one time location of one of more SSs based at least in part on the received indication.

37. The apparatus of claim 36, wherein the instructions are further executable by the processor to:
identify at least one time location to monitor for one or more sets of SS blocks based at least in part on the received indication of the SS burst set pattern; and
monitor the identified at least one time location for the one or more sets of SS blocks.

38. The apparatus of claim 37, wherein the instructions executable by the processor to receive the transmission including the indication of the SS burst set pattern comprise instructions further executable by the processor to:
receive an indication of a slot occupancy pattern for a set of slots, the slot occupancy pattern indicating one or more slots of the set of slots that contain SS blocks of the one or more sets of SS blocks.

39. The apparatus of claim 37, wherein a set of SS blocks of the one or more sets of SS blocks comprises a primary synchronization signal (PSS) symbol, a secondary synchronization signal (SSS) symbol, one or more physical broadcast channel (PBCH) symbols, and one or more demodulation reference signals (DMRS) of one or more PBCH symbols.

40. The apparatus of claim 39, wherein an ordering of the set of SS symbols comprises the PSS symbol, followed by a first of the one or more PBCH symbols, followed by the SSS symbol, followed by a second of the one or more PBCH symbols, followed by a third of the one or more PBCH symbols.

41. The apparatus of claim 37, wherein the instructions are further executable by the processor to:
identify at least one time location to monitor for control information based at least in part on the received indication of the SS burst set pattern.

42. The apparatus of claim 41, further comprising:
monitoring for one or more sets of SS blocks in a first subcarrier spacing; and
monitoring for the control information in a second subcarrier spacing.

43. The apparatus of claim 41, wherein the instructions are further executable by the processor to:
monitor the at least one time location for one or more sets of SS blocks based at least in part on the received indication of the SS burst set pattern; and
monitor for control information in a slot prior to the at least one time location monitored for the one or more sets of SS blocks, wherein the control information comprises downlink control information.

44. The apparatus of claim 43, wherein the instructions executable by the processor to monitor for the control information in the slot comprise instructions further executable by the processor to:
monitor for the downlink control information in one or two symbols of the slot prior to the at least one time location monitored for the one or more sets of SS blocks.

45. The apparatus of claim 41, wherein the instructions are further executable by the processor to:
monitoring the at least one time location for one or more sets of SS blocks based at least in part on the received indication of the SS burst set pattern; and
transmit uplink control information in one or two symbols of a slot after the at least one time location in the slot monitored for the one or more sets of SS blocks.

46. The apparatus of claim 37, wherein the instructions are further executable by the processor to:
identify, based at least in part on the received indication of the SS burst set pattern, a guard period between two of the one or more sets of SS blocks.

47. The apparatus of claim 36, wherein the instructions executable by the processor to receive the transmission including the indication of the SS burst set pattern comprise instructions further executable by the processor to:
 receive an indication of at least one time location of SS blocks within the SS burst set pattern.

48. The apparatus of claim 47, wherein the indication of the at least one time location of the SS blocks comprises a symbol, or a slot, or a radio frame location, or a combination thereof, of the SS blocks within the SS burst set pattern.

49. The apparatus of claim 36, wherein the instructions are further executable by the processor to:
 identify a first subcarrier spacing for SSs; and
 identify the SS burst set pattern based at least in part on the received indication of the SS burst set pattern and the first subcarrier spacing.

50. The apparatus of claim 36, wherein the instructions are further executable by the processor to:
 identify a second subcarrier spacing for non-SSs; and
 identify the SS burst set pattern based at least in part on the received indication of the SS burst set pattern and the second subcarrier spacing.

51. An apparatus for wireless communication, comprising:
 a processor;
 memory in electronic communication with the processor; and
 instructions stored in the memory and operable, when executed by the processor, to cause the apparatus to:
  identify a synchronization signal (SS) burst set pattern, the SS burst set pattern indicating at least one time location for one or more sets of SS blocks;
  transmit a transmission including an indication of the identified SS burst set pattern, the indication provided via a primary synchronization signal (PSS), or a secondary synchronization signal (SSS), or a handover message, or a combination thereof, that indicates the identified SS burst set pattern; and
  transmit the one or more sets of SS blocks based at least in part on the identified SS burst set pattern.

52. The apparatus of claim 51, wherein the instructions executable by the processor to identify the SS burst set pattern further comprise instructions further executable by the processor to:
 identify the at least one time location of the one or more sets of SS blocks within the SS burst set pattern.

53. The apparatus of claim 52, wherein the at least one time location of the one or more sets of SS blocks within the SS burst set pattern comprises a symbol, or a slot, or a radio frame location, or a combination thereof, of the SS blocks within the SS burst set pattern.

54. The apparatus of claim 51, wherein the instructions executable by the processor to transmit the transmission including the indication of the identified SS burst set pattern comprise instructions further executable by the processor to:
 transmit an indication of a slot occupancy pattern for a set of slots, the slot occupancy pattern indicating one or more slots of the set of slots that contain SS blocks of the one or more sets of SS blocks.

55. The apparatus of claim 51, wherein the instructions are further executable by the processor to:
 identify a first subcarrier spacing for SSs; and
 identify the SS burst set pattern based at least in part on the first subcarrier spacing.

56. The apparatus of claim 55, wherein the instructions executable by the processor to identify the first subcarrier spacing comprise instructions further executable by the processor to:
 identify the first subcarrier spacing based at least in part on a system operating bandwidth.

57. The apparatus of claim 51, wherein the instructions are further executable by the processor to:
 identify a second subcarrier spacing for non-SSs; and
 identify the SS burst set pattern based at least in part on the second subcarrier spacing.

58. The apparatus of claim 57, wherein the instructions executable by the processor to identify the second subcarrier spacing comprise instructions further executable by the processor to:
 identifying the second subcarrier spacing based at least in part on a system operating bandwidth.

59. The apparatus of claim 51, wherein a set of SS blocks of the one or more sets of SS blocks comprises a primary synchronization signal (PSS) symbol, a secondary synchronization signal (SSS) symbol, one or more physical broadcast channel (PBCH) symbols, and one or more demodulation reference signals (DMRS) of one or more PBCH symbols.

60. The apparatus of claim 59, wherein an ordering of the set of SS symbols comprises the PSS symbol, followed by a first of the one or more PBCH symbols, followed by the SSS symbol, followed by a second of the one or more PBCH symbols, followed by a third of the one or more PBCH symbols.

61. The apparatus of claim 51, wherein the instructions are further executable by the processor to:
 transmit, based at least in part on the identified SS burst set pattern, control information in a slot using a first subcarrier spacing, wherein the one or more sets of SS blocks are transmitted in the slot using a second subcarrier spacing.

62. The apparatus of claim 61, wherein the control information comprises downlink control information.

63. The apparatus of claim 51, wherein the instructions are further executable by the processor to:
 transmit downlink control information in a slot prior to transmitting the one or more sets of SS blocks in the slot based at least in part on the identified SS burst set pattern.

64. The apparatus of claim 63, wherein the instructions executable by the processor to transmit the downlink control information in the slot comprise instructions further executable by the processor to:
 transmit the downlink control information in one or two symbols of the slot prior to transmitting the one or more sets of SS blocks in the slot.

65. The apparatus of claim 51, wherein the instructions are further executable by the processor to:
 monitor for uplink control information in one or two symbols of a slot after transmitting the one or more sets of SS blocks in the slot.

66. An apparatus for wireless communication, comprising:
 means for receiving a transmission including an indication of a synchronization signal (SS) burst set pattern, the indication provided via a primary synchronization signal (PSS), or a secondary synchronization signal (SSS), or a handover message, or a combination thereof, that indicates the SS burst set pattern; and means for determining at least one time location of one of more SSs based at least in part on the received indication.

67. The apparatus of claim 66, further comprising:
means for identifying at least one time location to monitor for one or more sets of SS blocks based at least in part on the received indication of the SS burst set pattern; and
means for monitoring the identified at least one time location for the one or more sets of SS blocks.

68. The apparatus of claim 67, wherein the means for receiving the transmission including the indication of the SS burst set pattern further comprise:
means for receiving an indication of a slot occupancy pattern for a set of slots, the slot occupancy pattern indicating one or more slots of the set of slots that contain SS blocks of the one or more sets of SS blocks.

69. An apparatus for wireless communication, comprising:
means for identifying a synchronization signal (SS) burst set pattern, the SS burst set pattern indicating at least one time location for one or more sets of SS blocks;
means for transmitting a transmission including an indication of the identified SS burst set pattern, the indication provided via a primary synchronization signal (PSS), or a secondary synchronization signal (SSS), or a handover message, or a combination thereof, that indicates the SS burst set pattern; and
means for transmitting the one or more sets of SS blocks based at least in part on the identified SS burst set pattern.

70. The apparatus of claim 69, wherein the means for identifying the SS burst set pattern further comprise:
means for identifying the at least one time location of the one or more sets of SS blocks within the SS burst set pattern.

71. A non-transitory computer readable medium storing code for wireless communication, the code comprising instructions executable by a processor to:
receive a transmission including an indication of a synchronization signal (SS) burst set pattern, the indication provided via a primary synchronization signal (PSS), or a secondary synchronization signal (SSS), or a handover message, or a combination thereof, that indicates the SS burst set pattern; and
determine at least one time location of one of more SSs based at least in part on the received indication.

72. A non-transitory computer readable medium storing code for wireless communication, the code comprising instructions executable by a processor to:
identify a synchronization signal (SS) burst set pattern, the SS burst set pattern indicating at least one time location for one or more sets of SS blocks;
transmit a transmission including an indication of the identified SS burst set pattern, the indication provided via a primary synchronization signal (PSS), or a secondary synchronization signal (SSS), or a handover message, or a combination thereof, that indicates the SS burst set pattern; and
transmit the one or more sets of SS blocks based at least in part on the identified SS burst set pattern.

* * * * *